(12) United States Patent
Takatsu

(10) Patent No.: US 6,535,702 B1
(45) Date of Patent: Mar. 18, 2003

(54) PRECEDENT JOB STATUS COMFIRMABLE USER INTERFACE AND INFORMATION PROCESSING APPARATUS

(75) Inventor: Akiko Takatsu, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/714,216

(22) Filed: Nov. 17, 2000

(30) Foreign Application Priority Data

Nov. 17, 1999 (JP) .......................... 11-326864
Nov. 17, 1999 (JP) .......................... 11-326868

(51) Int. Cl.$^7$ .............................................. G03G 15/00
(52) U.S. Cl. .......................................... 399/81; 399/82
(58) Field of Search ............................... 399/81, 82, 85

(56) References Cited

U.S. PATENT DOCUMENTS

| | | | | |
|---|---|---|---|---|
| 5,045,880 A | * | 9/1991 | Evanitsky et al. ............ | 399/82 |
| 5,422,705 A | * | 6/1995 | Omelchenko et al. ..... | 399/81 X |
| 5,689,765 A | * | 11/1997 | Nishinozono ................. | 399/81 |
| 5,960,247 A | * | 9/1999 | Morikawa .................. | 399/84 X |
| 5,995,779 A | * | 11/1999 | Natsume et al. ............... | 399/82 |
| 6,091,912 A | | 7/2000 | Kitajima et al. ............... | 399/13 |

\* cited by examiner

*Primary Examiner*—Fred L Braun
(74) *Attorney, Agent, or Firm*—Oblon, Spivak, McClelland, Maier & Neustadt, P.C.

(57) ABSTRACT

A user interface for use in an image processing apparatus accepts and reserves a job request from a user. The user interface includes an input operation screen composed of a touch panel and allows a new job input operation while indicating a status of a precedent job in progress. Thereby, a user, who is inputting a new job request, can notice a problem occurring during an operation of the precedent job and take an appropriate countermeasure without waiting until the precedent job is completed.

12 Claims, 25 Drawing Sheets

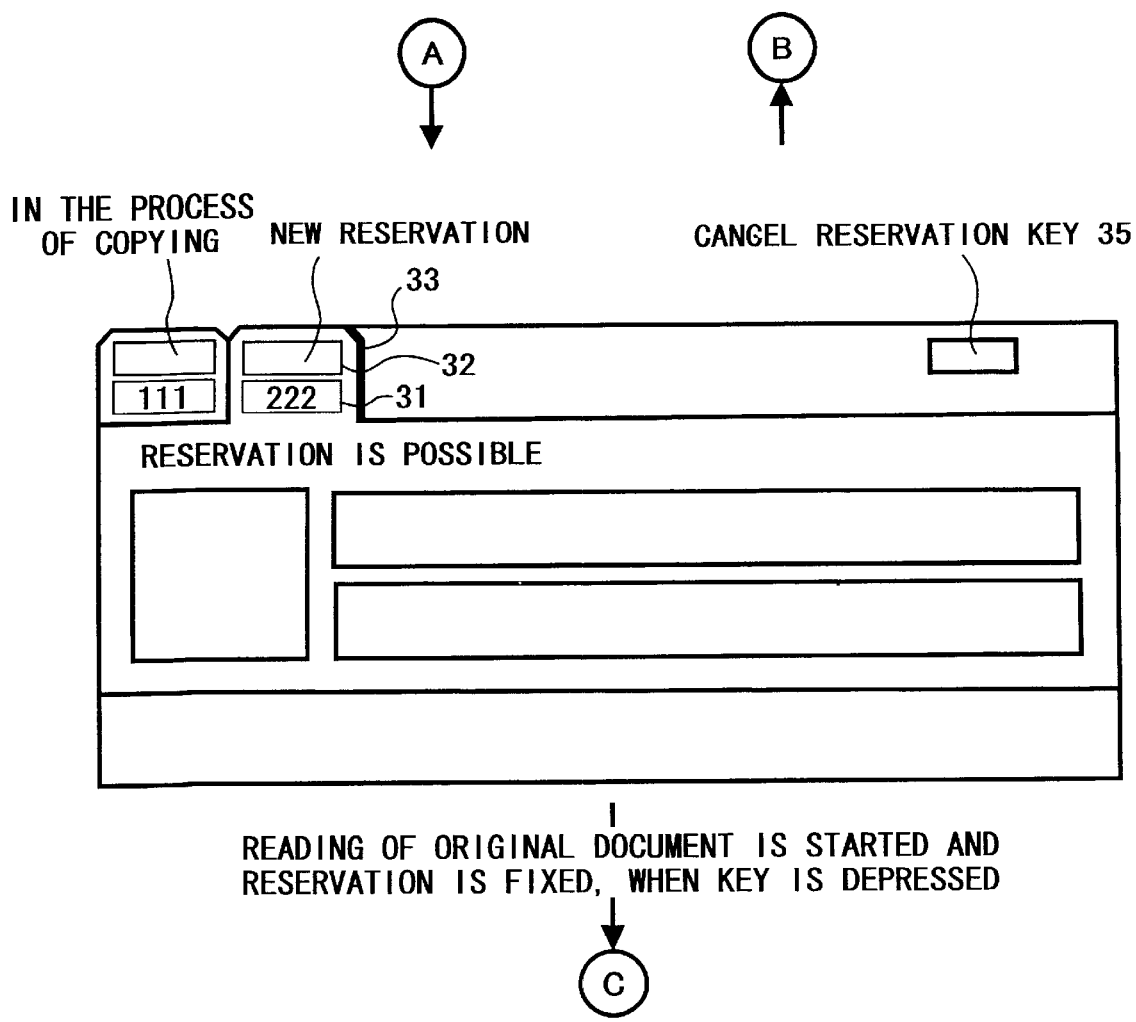

PRINTING JOB "222" IS COMPLETED

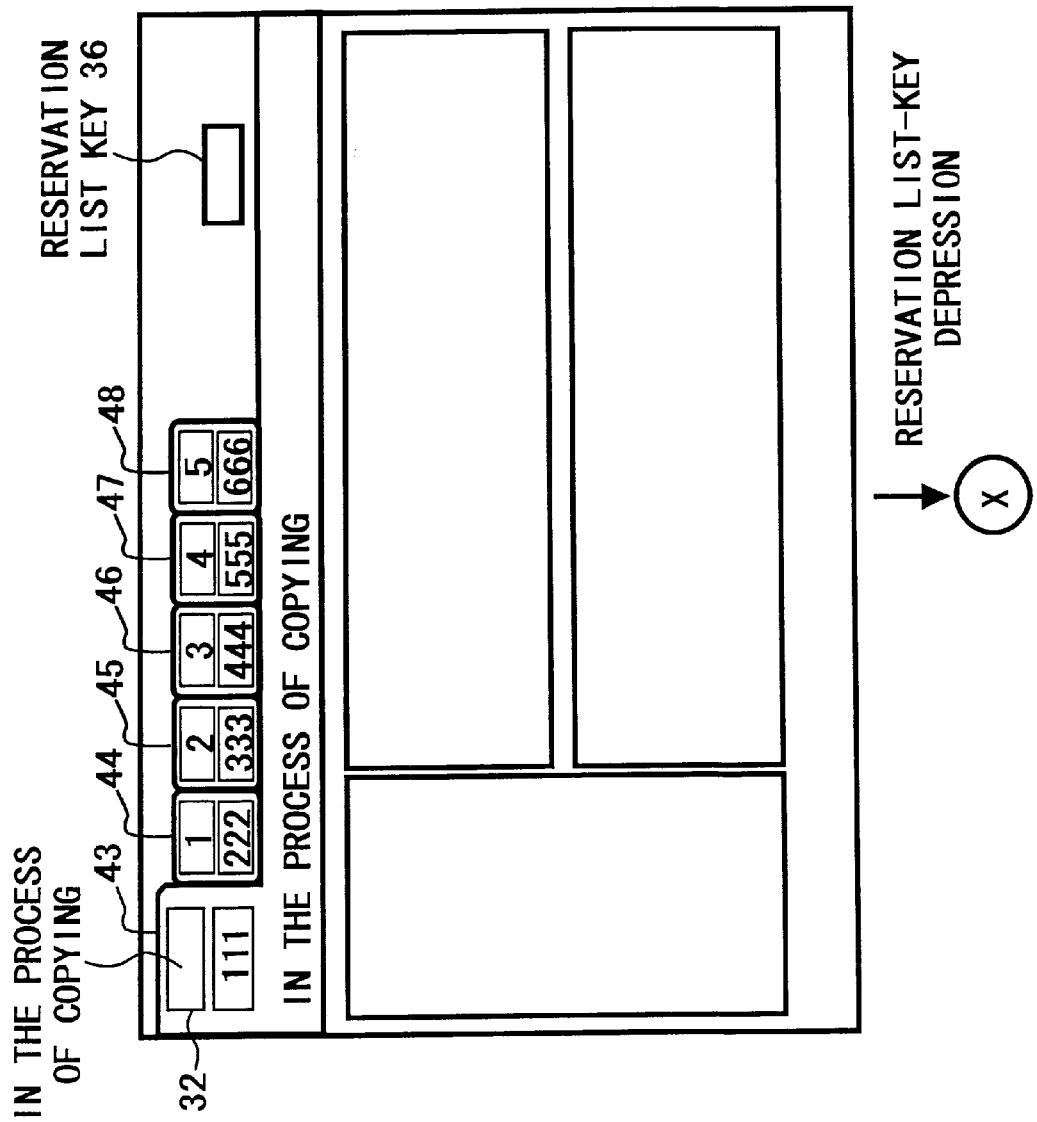

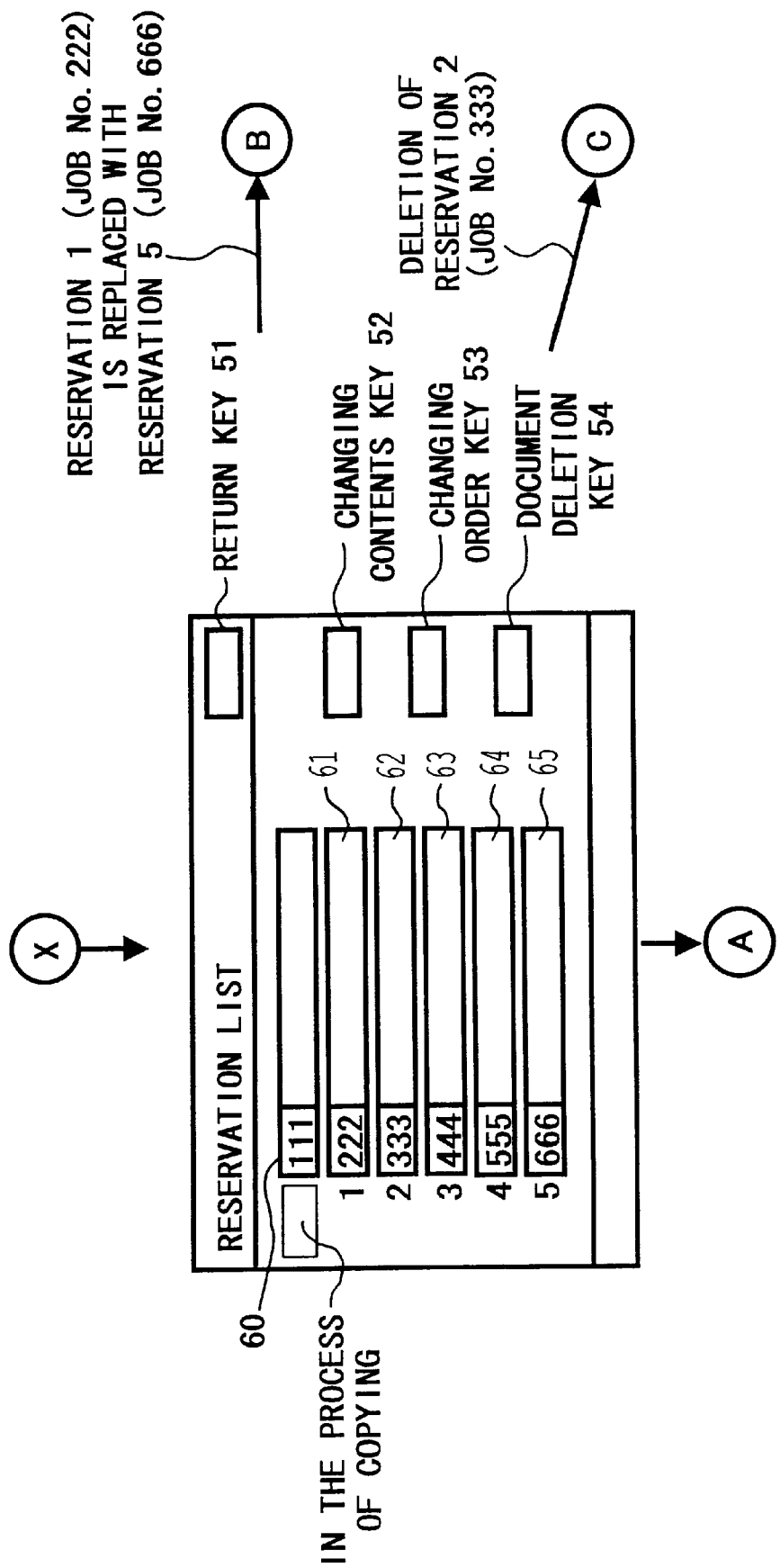

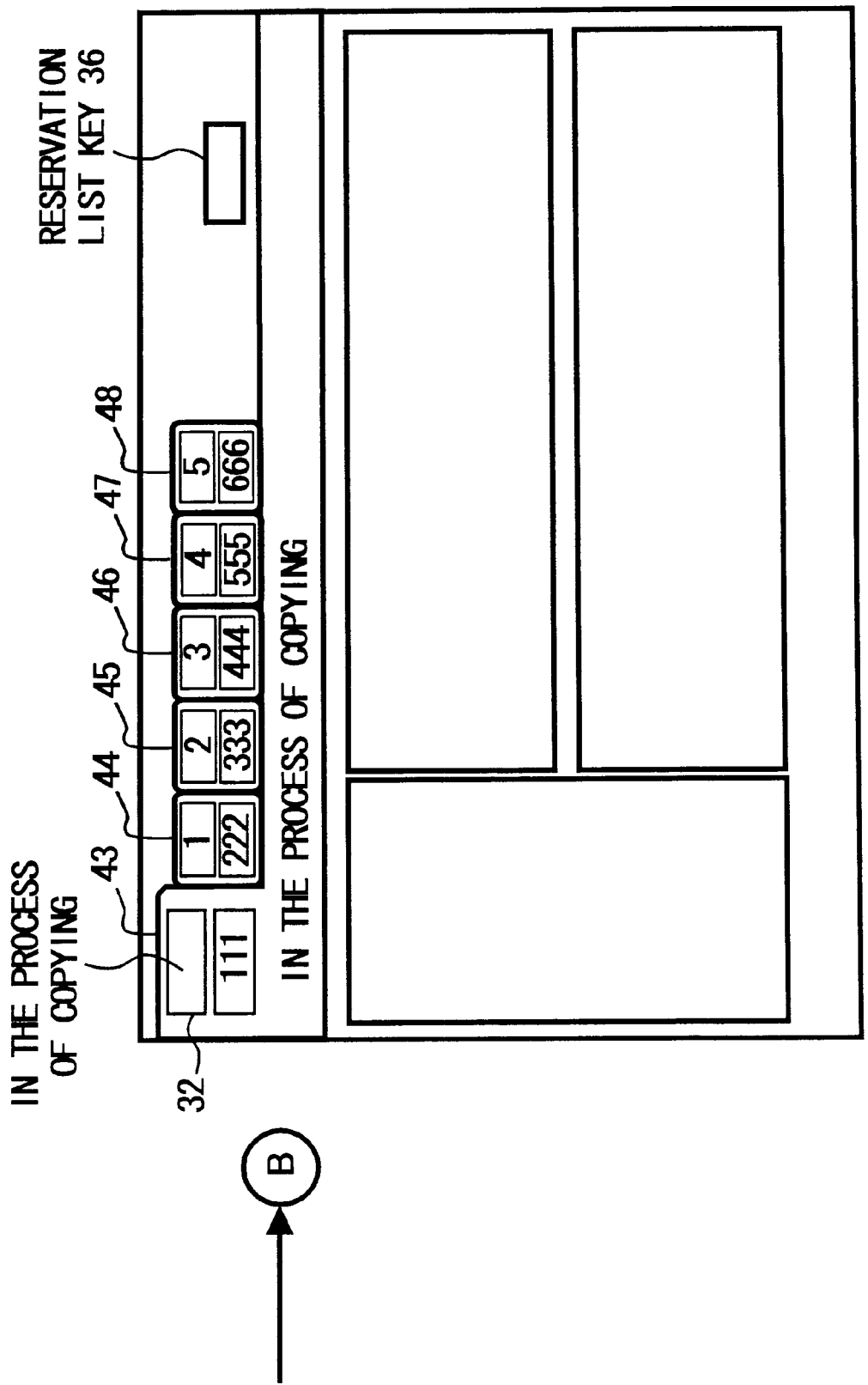

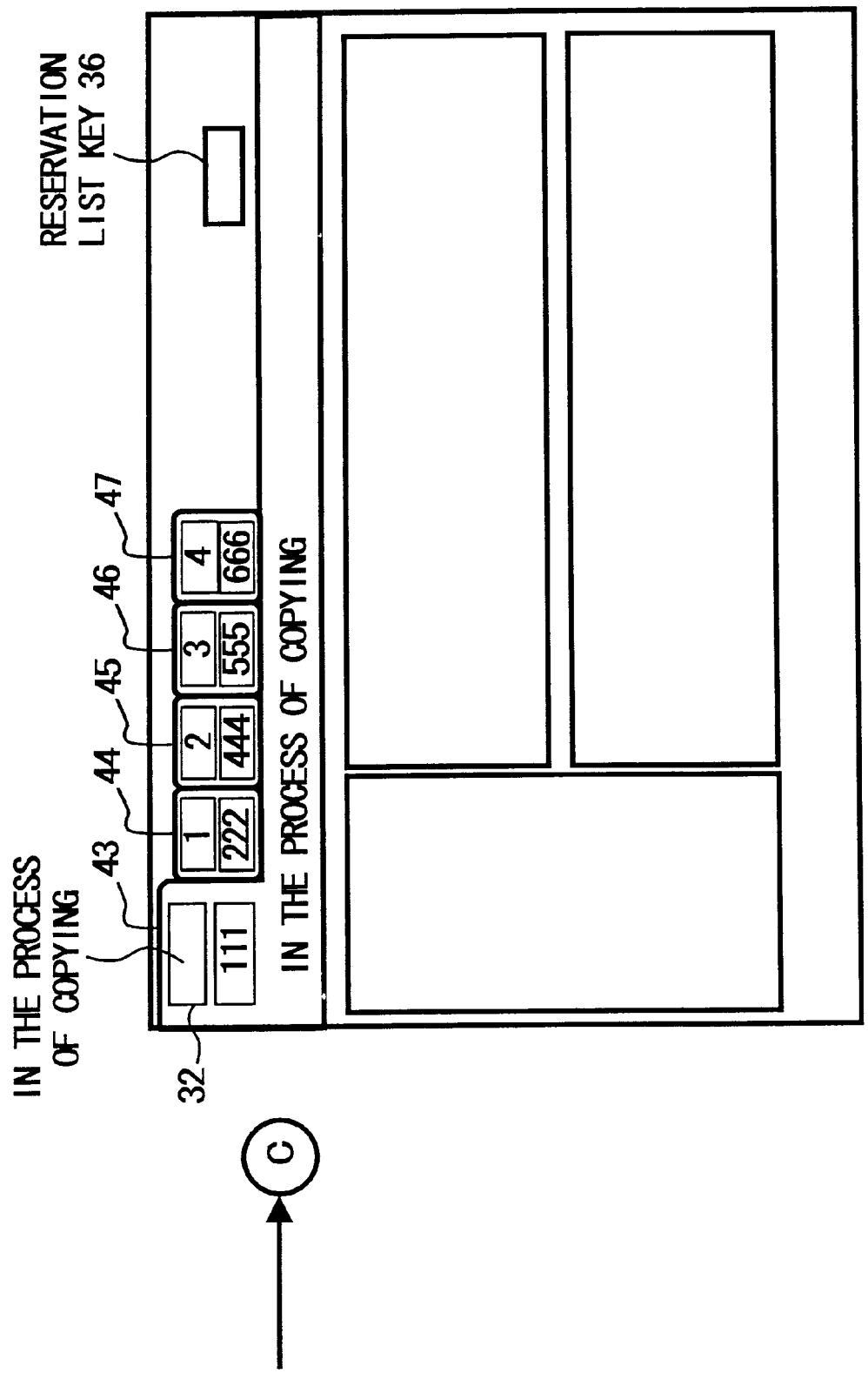

PRECEDENT JOB STATUS COMFIRMABLE USER INTERFACE AND INFORMATION PROCESSING APPARATUS

CROSS REFERRENCE TO RELATED APPLICATIONS

This application claims priority under 35 USC §119 to Japanese Patent Application Nos. 11-326864 and 11-326868, both filed on Nov. 17, 1999, the entire contents of both of which are incorporated by reference herein.

BACKGROUND OF THE INVENTION

1. Field of the Invention

The present invention generally relates to an image processing apparatus, such as a copier, a facsimile, a printer, combination thereof, etc., and in particular relates to an operation panel having a job inputting display functioning as a user interface capable of inputting a job to be processed by the image processing apparatus.

2. Discussion of the Background

Recently, image processing devices, such as copiers, a facsimile machines, printers, etc., capable of accepting a job reservation during an operation of a precedent job have been developed. In this way, such devices can handle simultaneously a plurality of jobs without having to wait for completion of a precedent job. According to the simultaneous handling function, a new job reservation can be performed to the extent that the new job reservation input operation does not interfere with the precedent job in progress.

Such a simultaneous handling function can be realized by using a backup function, wherein an original document is fed and read by a reading section during the time that a precedent job is being processed. Image data obtained by reading the original document typically is stored in a memory having a prescribed capacity. In addition, image processing devices using such a function are put on standby when the reading section completes the reading operation of the original document.

However, information related to the precedent job in progress generally is not displayed on a user interface when a user inputs a new job reservation thereto. As a result, the user cannot recognize the status of the precedent job nor, in a rare instance, the existence thereof. Accordingly, the user is forced to wait until one or more precedent reserved jobs are completed.

In addition, a countermeasure against a problem occurring in the precedent job is sometimes ignored due to non-detection of such occurrence. Further, a wrong countermeasure is sometimes taken due to such problems, causing a malfunction of the device (e.g., when a tray in use is erroneously removed).

To overcome such above-noted drawbacks, background art devices provide a lamp to inform a user of a status of a job in process. Such a lamp may be provided, for example, on or in the vicinity of a hard key (i.e., a key other than a display key) and may blink in predetermined manner in accordance with the job status or problem.

However, it is generally difficult for a user to notice such blinking in the above-noted device. In addition, a user typically cannot determine details of the status or the problem, even if the user notices the blinking. Further, such devices are being increasingly utilized leading to increased occurrences of the noted problems.

Moreover, with such devices, when a plurality of jobs are subsequently reserved, a user typically cannot recognize when a job currently reserved is handled, how many jobs have been reserved and how many jobs are allowed to be reserved. This is because information related to such reservations typically is not displayed on an operation display or on a hard key

SUMMARY OF THE INVENTION

Accordingly, an object of the present invention is to address and resolve the abovenoted and other problems and provide a new user interface for use in an image processing apparatus, which accepts and reserves a job request from a user.

The above and other object are achieved according to the present invention by providing a novel user interface including an input operation screen having a display and which allows a new job input operation while indicating a status of a precedent job in process. As a result, a user, who is inputting the new job (i.e., reserving the new job), can be made aware of a problem occurring in the precedent job and take an appropriate countermeasure.

In another aspect of the present invention, information of at least any one of a currently processed job and one or more reserved jobs not yet processed are displayed on the input operation display in a form of a list.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIGS. 7A, 7B, 7C, 7D, 7E and 7F are diagrams for illustrating a transition of a reservation screen when a reservation job is newly input and is canceled, according to the second embodiment of the present invention;

FIGS. 10A, 10B, 10C, 10D and 10E are diagrams for illustrating a transition of a reservation screen during job order processing and/or when contents of a reserved job are changed and a reservation is canceled, according to the second embodiment of the present invention.

DETAILED DESCRIPTION OF THE PREFERRED EMBODIMENTS

Figure 1:
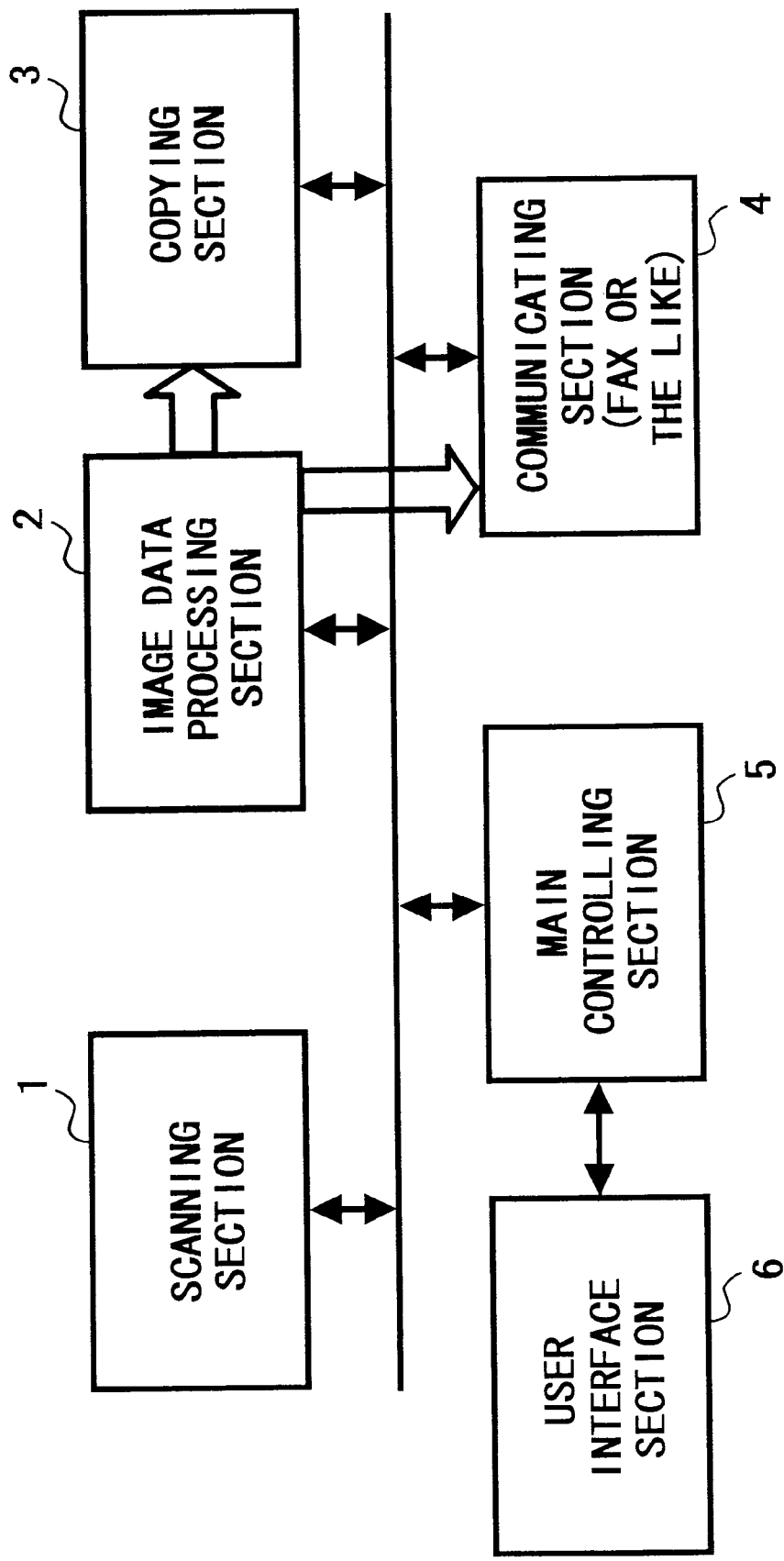
FIG. 1 is a block diagram for illustrating a combined digital copier to which a user interface of the present invention is applied.

Referring now to the drawings, wherein like reference numerals designate identical or corresponding parts throughout the several views, and particular to FIGS. 1–10 which illustrate various embodiments of the present invention, as will now be described.

A combined digital copier, as one example of an information processing apparatus, to which a user interface of the present invention is applied, is herein below described. As illustrated in FIG. 1, the combined digital copier may include functions of a copier, a facsimile and a scanner. Specifically, the combined digital copier may include a scanning section 1, an image data processing section 2 and a copying section 3. Further, the combined digital copier may include a communications section 4 for communicating image data with an outside terminal (e.g., to implement a facsimile function), a main control section 5 including, for example, a central processing unit (CPU) and a user interface section 6.

The image data processing section 2 may include a scanner interface (I/F, not shown), a copying I/F (not shown) for interfacing with the copying section 3 and a communication I/F (not shown) for interfacing with the communications section 4 (e.g., for implementing a facsimile function). The image data processing section 2 may further include a variety of image data processing circuits and an image data storage device (not shown). The image data processing section 2 may receive, for example, image data read from an original document by the scanner section 1, via the scanner I/F. The image data processing section 2 may apply a variety of image processes to the image data based on instructions transmitted from the CPU 5, and then store the image data in an image data storage device (not shown). The copying I/F may transmit the image data stored in the data storage device to a controller of the copying section 3. The copying section 3 may execute prescribed image formation on a transfer sheet based on the image data by using an electrophotographic process and execute a post transfer sheet treatment, such as a punching operation, a stapling operation, etc., on sheets after a transferring operation.

The communications section 4 may receive the image data, for example, stored in the data storage device, via the communication I/F and after converting the image data to a appropriate data form suitable for a facsimile communication transmit the same. The user I/F section 6 may convey a job request, such as a facsimile transmission of image data, image formation, etc., generated by an input operation performed by a user. The main control section 5 may control a copying operation executed in the copying section 3. The main control section 5 may receive a job request from the user I/F section 6 and generate instructions for executing a copier processing operation, a facsimile processing operation, and a scanner processing operation based on instructions of the job request.

The user I/F section 6 may include an information input device, such as a touch panel, etc., as a display. The user VF section 6 may accept an input operation for inputting a variety of copying conditions of the copying section 3 and a variety of reading conditions of the scanner section 1. The user I/F section may display information to be selected and input to assist the user when the user inputs conditions and confirms contents thereof. The user I/F section 6 may be configured to allow a new job request, even if a preceding job is in progress. Further, the user I/F section 6 may output on a display an input operation screen. For example, a status of a job in progress, reading of an original document, copying of an original document, etc., may be indicated on the input operation screen output on the display. Whenever an input operation screen is displayed, various messages, such as "JOB IS IN THE PROCESS OF SETTING," "CONTENTS INPUTTED ARE IN THE PROCESS OF BEING CONFIRMED," etc., are indicated. Applications of the above-described jobs may include a copier, a facsimile, a copy server, etc. Thus, a status of the job may be indicated on a confirming screen for confirming contents of a job in progress.

Details of a job status may be indicated by identifying and specifying a job in progress and identifying information related to a progress status of the job (i.e., a current processing step). The status of the job can be related to reading of an original document, copying of the original document, a job completion estimated time, occurrence of an error, contents of the error, a toner remaining amount, etc. A private use indication area may be provided on a portion of the input operation screen and a prescribed indication method, so that an operator does not miss messages, may be adopted.

One example of an input operation screen function included in the user I/F section will now be described in detail with reference to FIG. 2. One example of an input operation screen 100 may include a status display area in which a job is reserved by inputting a job. The input operation screen 100 may allow a reservation job input operation and enable a user to confirm contents of the reserved job thereon.

A layout of the input operation screen 100 may be configured as follows. Information related to a job in progress or to be confirmed may be arranged on a grid background area of a principal indication area 11. Information related to a job, which has already been input and is in progress, may be indicated in a white background area, i.e., a section 21 (status display section), positioned below the principal displaying area 11. The status display section 21 can be positioned at another portion of the input operation screen. It is however preferable that a private use area is provided for the status display section 21 with a position thereof not changed, even if a different application is utilized (i.e., a layout of the principal displaying area 11 is changed), for consistency of use.

Information representing a status of a job in progress to be indicated on the status displaying section 21 will now be described in detail, with reference to FIG. 2. Since two or more jobs, such as an original document reading job for a current reservation, a copying job for a precedent reservation, etc., can be simultaneously processed according to the present invention, a status of respective jobs may be displayed in the status display section 21. To this end, the status indication portion 21 may be separated into an upper stage and a lower stage, for example.

Figure 2:
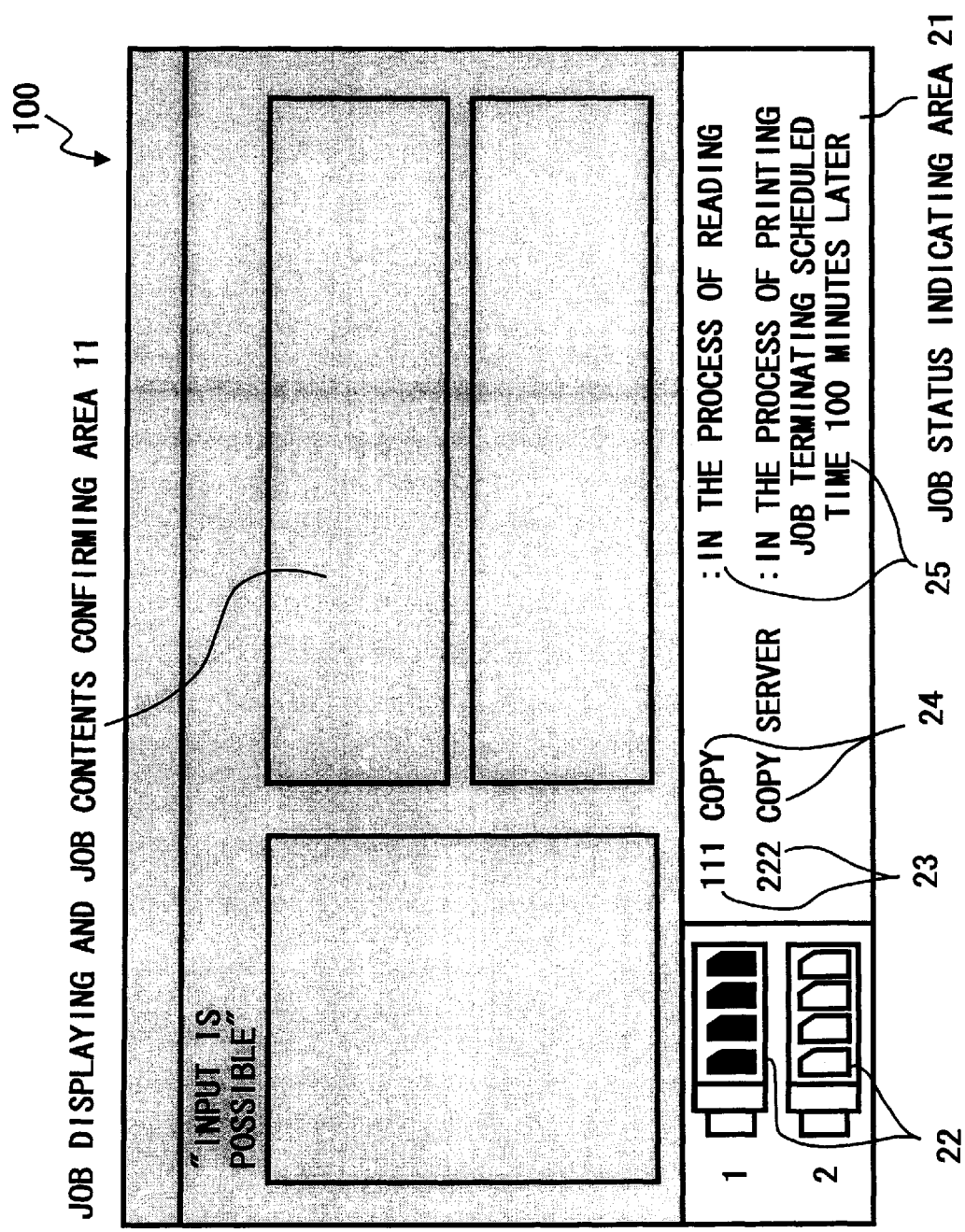
FIG. 2 is a diagram for illustrating an exemplary input operation screen, which includes an area for indicating at least a status of a precedent job and is displayed when a reservation job is newly input, according to a first embodiment of the present invention.

As illustrated in FIG. 2, a job number indication section 23, a job type indication section 24 for indicating a type of a job (i.e., an application type) in progress, and a job progress status display section 25 may be included in the status displaying section 21. In this example, a job number 111 may be indicated in the job number indication section 23 on the upper stage. A job name "copy" may be indicated in the job type indication section 24 corresponding to the job number 111. In addition, messages, such as "IN THE PROCESS OF READING" may be indicated in the job progress status display section 25 for the job number 111 and according to the copy application. Thus, a user can recognize from such information that the reading operation in progress is normally executing.

Further, a job number 222 may be indicated in the lower stage of the status displaying section 21. A job name "copy server" may be indicated in the job type indication section 24 corresponding to the job number 222. Moreover, the job progress status display section 25 may indicate messages, such as "in the process of copying" for the job number 222 and according to the copy server application. Thus, the user can recognize from such information that the copying in the precedent job in progress is normally executing. In addition, a copy termination estimated time might also be indicated with messages, such as "termination schedule is estimated as 1000 minutes later".

Since an image formation system using an electrophotographic process is adopted in the copying section 3 as illustrated in FIG. 1, a toner remaining amount may also be indicated in a toner remaining amount indication section 22. Such indication may be provided, for example, in a left side portion of the status display section 21. Since two or more toner cartridges may be utilized according to the present invention, a toner remaining amount may be displayed utilizing, for example, illustrations of two toner bottles. When any one of toner bottles is full with toner, this may be illustrated by a solid black toner bottle image. In contrast, as a toner bottle is emptied of the toner, this may be illustrated with a corresponding solid white portion in toner bottle image. If a toner bottle is not attached, no toner bottle images may be indicated.

Another example of a status display section 21 will now be described, with reference to FIG. 3. A precedent job status is indicated in the job progress status indication section 25 when a new reservation job is input and an operation of the precedent job normally progressed. The following is, however, an example of an input operation screen displayed when a reservation job is input and a problem occurs in both a precedent job and a currently reserving job in progress.

Figure 3:
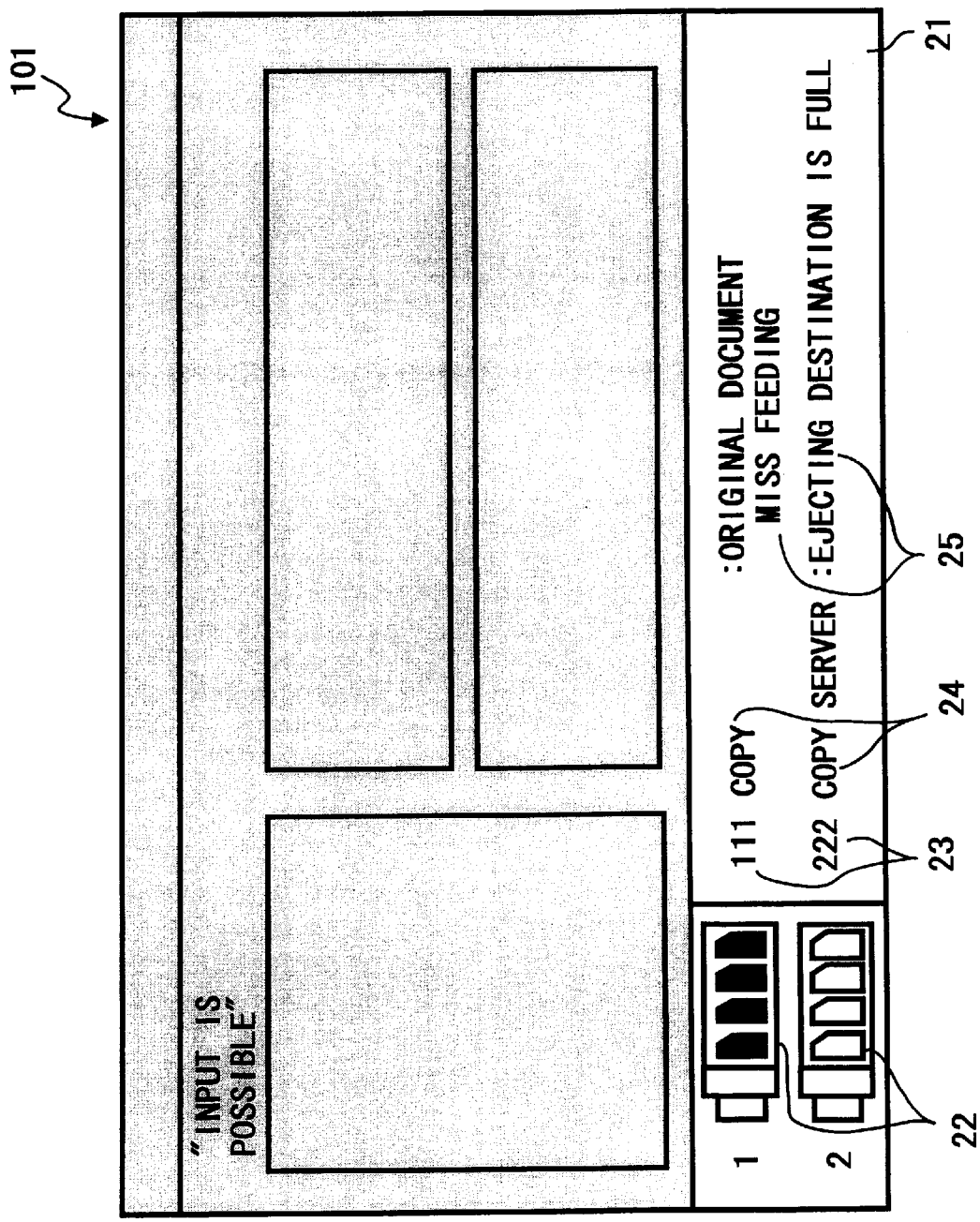
FIG. 3 is a diagram for illustrating an exemplary input operation screen displayed when a reservation job is newly input and a problem occurs in a precedent job in progress, according to the first embodiment of the present invention.

FIG. 3 illustrates another example of an input operation screen 101, wherein a prescribed job is input through a principal display section 11, and prescribed problem information may be indicated as described later. The input operation screen 101 may be displayed by overlaying on the input operation screen 100 illustrated in FIG. 2. When a problem occurs, the progress status display section 25 may indicate contents of the problem and suggest a countermeasure.

As one example, an application, such as "copy" may be indicated in a job type displaying section 24 for the job number 111. Further, messages, such as "ORIGINAL DOCUMENT MISS FEEDING" are indicated in the job progress status display section 25 for the job number 111 and according to the copy application. Accordingly, the user can recognize details of the problem from such information in that the reading operation is abnormally executing due to occurrence of miss feeding of the original document in the scanning section 1 during the new reservation. Non-detection of sheet size, etc., is an example of other such problems that may be indicated.

As another example, the job number 222 may be indicated in a lower stage of the status display section 21 with the job name "copy server" indicated in a job type displaying section 24. In addition, messages, such as "EJECTING DESTINATION IS FULL" may be indicated in the job progress status display section 25 for the job number 222 and according to the copy server application. Thus, the user can recognize details of the problem from such information in that a tray is full with sheets ejected thereon during copying (i.e., the sheets are not normally ejected) in the precedent job. In a similar manner, toner end, shortage of sheets, shortage of staples, etc., are other problems which may occur in the copying section 3 and that may be indicated on the job progress status display section 25.

In the above-described example, the progress status display section 25 simply indicates details of a problem as status information when the problem occurs. The following is an example wherein a job key indicating a countermeasure against a problem is displayed.

Figure 4:
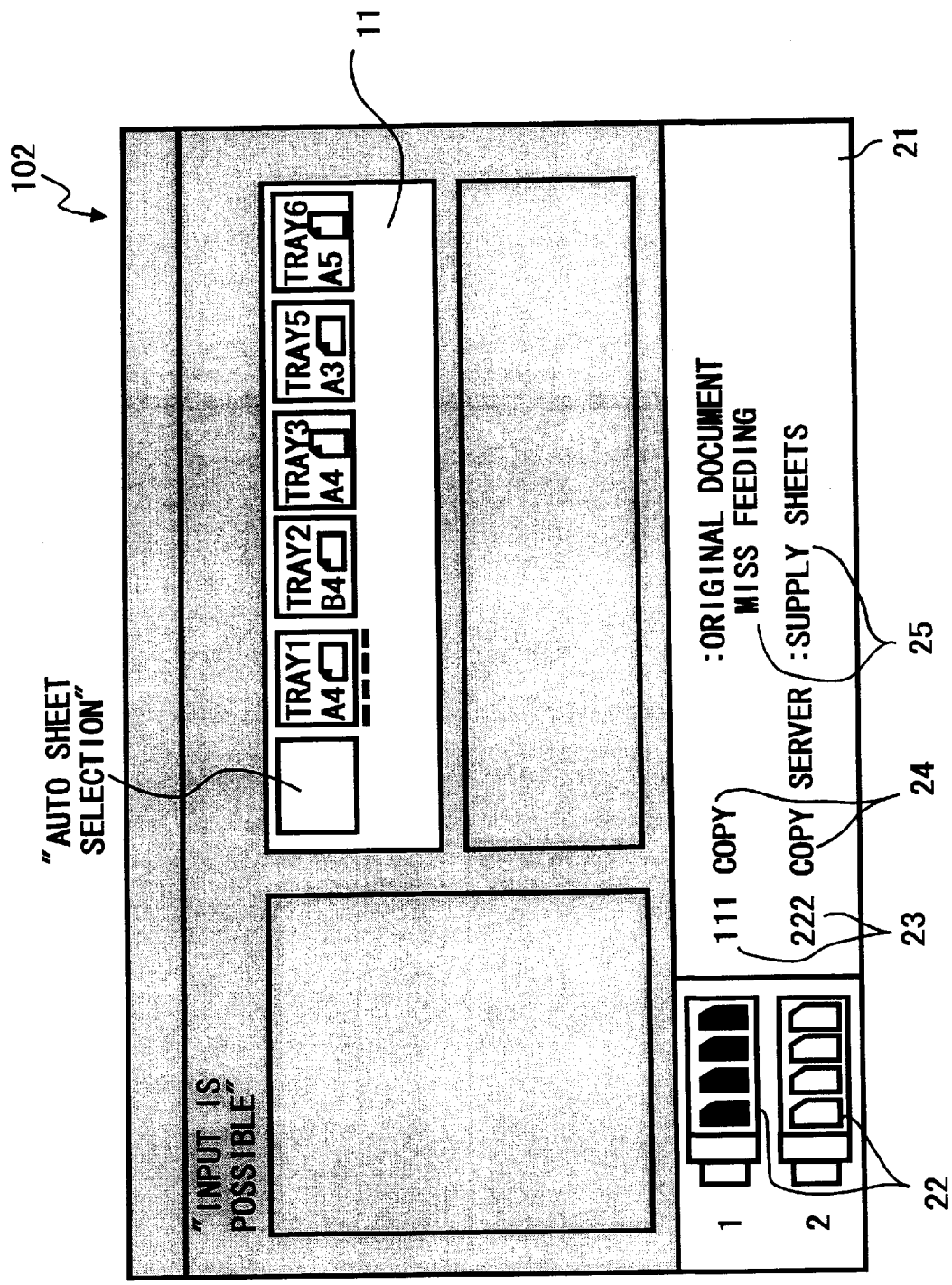
FIG. 4 is a diagram for illustrating an exemplary input operation screen indicating a countermeasure against a problem and which is displayed when a problem occurs in a precedent job in progress, according to the first embodiment of the present invention.

FIG. 4 illustrates such an example of an input operation screen 102 used when a reservation job is input and a problem occurs in the combined machine during a precedent job. The input operation screen 102 may be displayed by overlaying on the input operation screen 100 illustrated in FIG. 2. The job number 222 may be indicated in a lower stage of a status display section 21 with the job name "copy server" being indicated as an application in the job type displaying section 24. In addition, a job progress status display section 25 may indicate messages, such as "supply sheets" for the job number 222 and according to the copy server application. Thus, the user can determine an appropriate countermeasure against the problem from such information when a copier becomes short of sheets during its operation (i.e., it is impossible normally to produce a copy unless sheets are supplied). At this moment, it is generally required to inform a user of a prescribed tray, to which sheets are to be supplied, and size of the sheets. To this end, several tray designation soft keys may be displayed and may be optionally designated using a dotted under line as illustrated in FIG. 4. Thus, such sheet information need not be displayed in the status display section 21. However, depending on a design of a display of the principal display area 11, such messages can be indicated in the job progress status display section 25.

As noted in the examples described above with reference to FIGS. 2 to 4, the status display section 21 is positioned at the lower portion of the input operation screens 100 through 102. However, an upper portion of the input operation screen 100 can be utilized for the status display section 21 as described in the following example.

Figure 5:
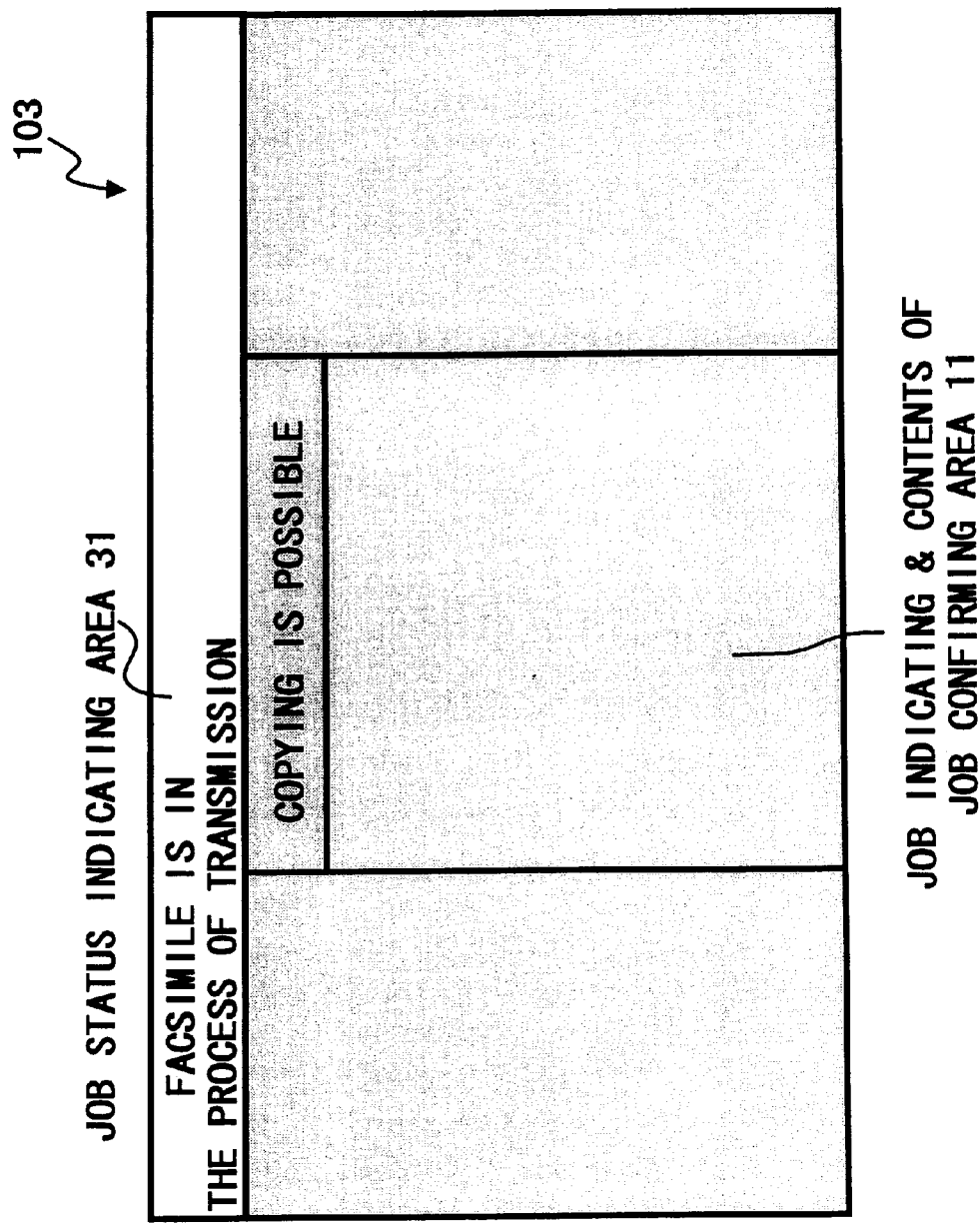
FIG. 5 is a diagram illustrating an exemplary input operation screen, which includes an area for indicating a status of a precedent job and which is displayed when a reservation job is newly input, according to the first embodiment of the present invention.

FIG. 5 illustrates such an input operation screen 103 that includes a status display section 31 at an upper portion of the input operation screen 103 for indicating status information of a precedent job. The status display section 31 may be for private use in this example and thus may not be moved from the upper portion, even if a different application is utilized (i.e., a layout of a view is changed). In addition, contents indicated in the job status display section 31 may be substantially the same as described with respect to FIGS. 2 to 4.

However, a number messages may be limited to a prescribed amount necessary to inform of problems, if the status display section 31 can not sufficiently occupy the input operation screen 103 due to the area reserved for a principal displaying portion 11. FIG. 5 illustrates an example of such minimal necessary information. Namely, only messages, such as "FACSIMILE IS IN THE PROCESS OF TRANSMISSION" are indicated.

According to the first embodiment, both a precedent job status and a current reservation operating status can be readily recognized in a various manners even while a user inputs a reservation job. The second embodiment of the present invention will now be described, with reference to FIGS. 6A through 10C. A combined machine of this embodiment may include a similar construction to that of the first embodiment except for the user interface section 6.

The user interface section 6 of the second embodiment may include additional functions for informing a user of a reservation condition, such as a number of existing job reservations, a number of allowable job reservations, etc. The reserved job may be monitored by a user on a single job input operation screen that displays entire reserved jobs while preventing the lowering of an operational performance of the user. In addition, when contents of a job reserved is changed, the change is automatically reflected to the entire jobs already reserved so that the user can always properly grasp the job reservation condition and/or its schedule.

Figure 6A:
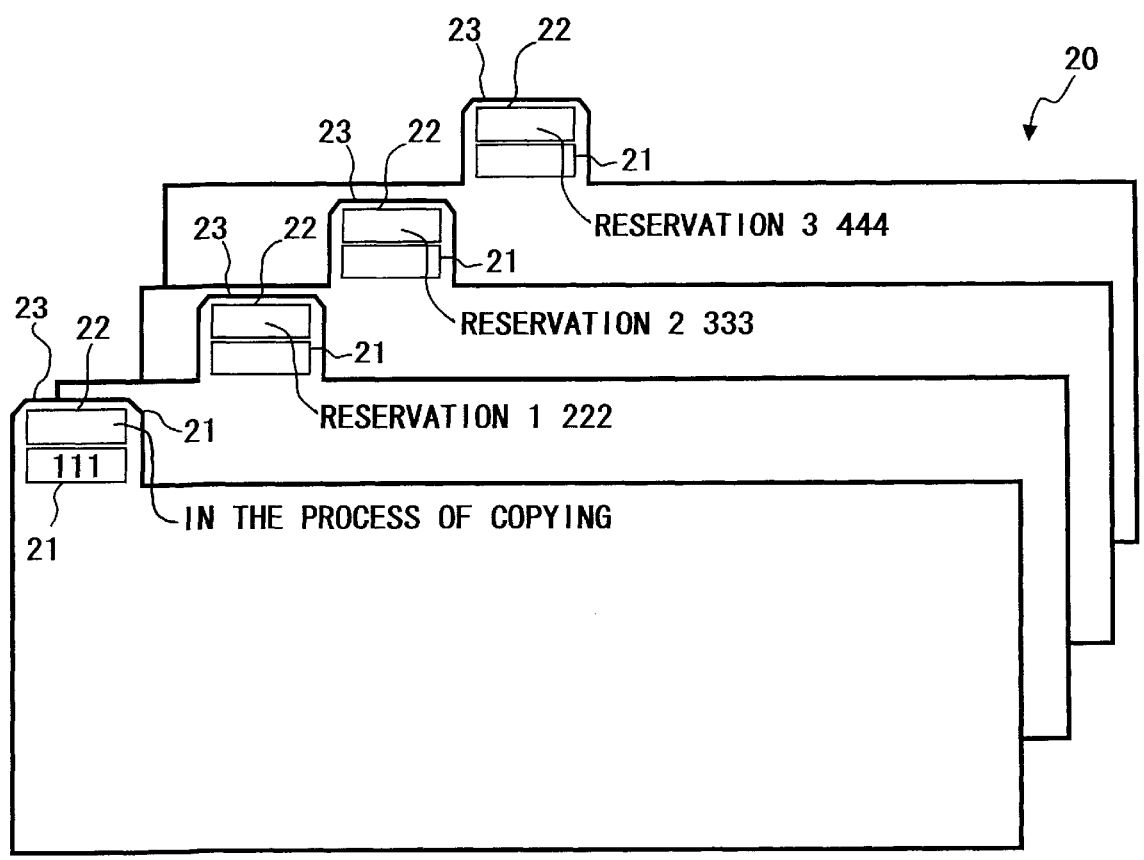
FIGS. 6A and 6B are diagrams for illustrating exemplary formats indicating a reservation job to be input and displayed on a user interface reservation screen, according to a second embodiment of the present invention.

The above-described function of the user interface section 6 will now be described in detail, with reference to FIG. 6A. FIG. 6A illustrates an image of a card 20 having a tab 23 protruding from its upper end. Each of the tabs 23 may constitute a later described reservation screen at least for inputting a reservation when displayed on an input operation screen. A job number indication portion 21 and a corresponding job condition indication portion 22 may be arranged in the tab 23, so that a plurality of reserved jobs and in progress can entirely be listed in a manner as described later.

Figure 6B:
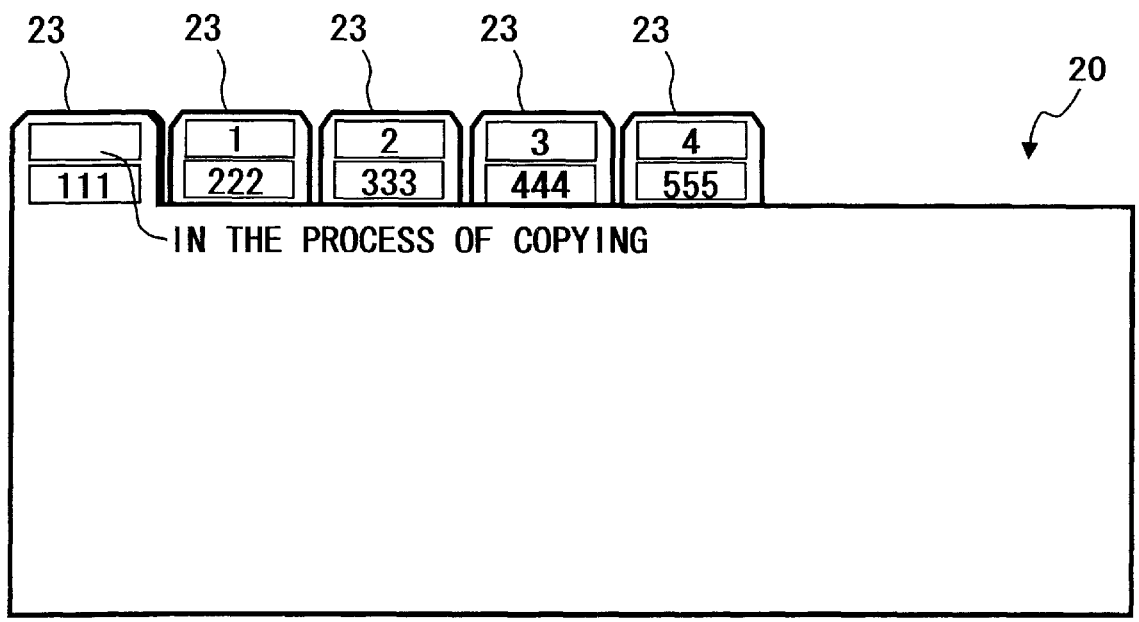

In the present example, a total four jobs can be recognized from a number of cards because sequential job numbers may be respectively assigned to respective of the cards. Such a card is formed one by one every time a job is newly reserved. When all of the cards are displayed on the input operation screen to be monitored, each of the cards is arranged with it being bound and adjusted so that each tab 23 longitudinally aligns in an order of a job number as illustrated in FIG. 6B. A job number may be sequentially assigned to the tab 23 in order of a job reservation, and the tabs may be ordered and arranged. In addition, information with respect to a job currently processed is indicated on a top most tab 23. In this example, since a job number 111 and messages, such as "IN THE PROCESS OF COPYING" are indicated on the top most tab 23, a job having the job number 111 is indicated as being in a process of copying.

A reservation function performed by the user interface section 6 will now be described, with reference to FIGS. 7A through 7F. FIGS. 7A through 7F collectively illustrate a transition of an input operation screen, while a plurality of reservations may be made and/or canceled. In this embodiment, a job may be reserved and canceled by a user through any one of cards displayed on the reservation screen, and existing reserved jobs may entirely be listed on the input operation screen when required. To this end, a prescribed plurality of input keys may be displayed for an applicable reservation screen in the vicinity of the tab 33 in a blank (e.g. a tab indication area bar), and respectively include messages, such as "NEW RESERVATION", "RESERVATION CANCEL" and "RESERVATION LIST" thereon.

In addition, a job status may be indicated on a job status indication portion 32 together with a job number in each of tabs 33. Namely, messages, such as "IN THE PROCESS OF COPYING", "NEW RESERATION", and "RESERVATION NUMBER" may be indicated as a job status. Since a touch panel is adopted as an input device in the present invention, a user can depress a key display portion of the touch panel when any key input is required. The job number may be automatically assigned in order of a job reservation to an applicable tab.

Figure 7A:
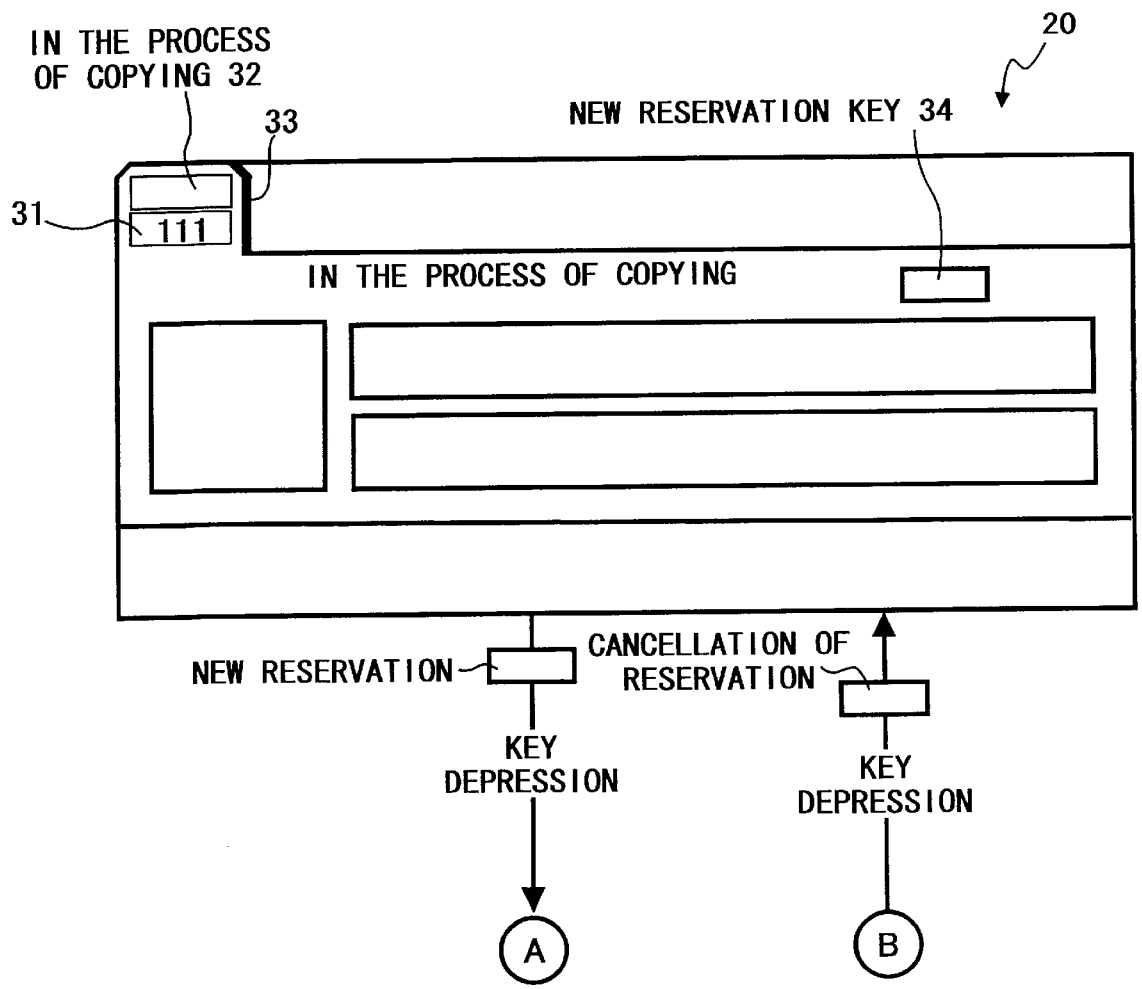

Both of a procedure of a new job reservation and a canceling operation are now described, with reference to FIGS. 7A through 7F. When a tab 33 indicates the job status "COPYING JOB IS IN THE PROCESS" as illustrated in FIG. 7A, and the new job reservation key 34 is depressed, the reservation screen may be changed to a new reservation screen illustrated in FIG. 7B. The number of tabs 33 may be increased and the new job reservation screen may be simultaneously open on the reservation screen of FIG. 7A as illustrated in FIG. 7B.

In addition, each of the job status "NEW RESERVATION" and a job number 222 may be indicated in respective of applicable portions on a newly formed tab 33. Simultaneously, job reservation information to be input may be indicated on the principal portion of the new job reservation screen with the indication of the job status "RESERVATION IS POSSIBLE". Another reservation screen, i.e., another card may be closed and instead only its tab may be displayed in smaller size beside the newly formed tab 33 indicating the job status "NEW RESERVATION" as illustrated in FIG. 7B.

A reservation cancel key 35 may be displayed at a prescribed timing in a blank area of the reservation screen to be depressed by a user when reservation is canceled before processing. When the reservation cancel key 35 is depressed, the job reservation screen illustrated in FIG. 7B may return to the reservation screen illustrated in FIG. 7A. On the other hand, when a job reservation input operation is executed through the job reservation screen of FIG. 7B, an original document for reservation use may be set on the reading section, and a start key (not shown) may be depressed. Subsequently, the reading operation may be started and the scanning section 1 may obtain image data from the original document. Thus, a copying operation is on standby and the reservation is fixed (i.e., formally accepted by the combined machine).

Figure 7C:
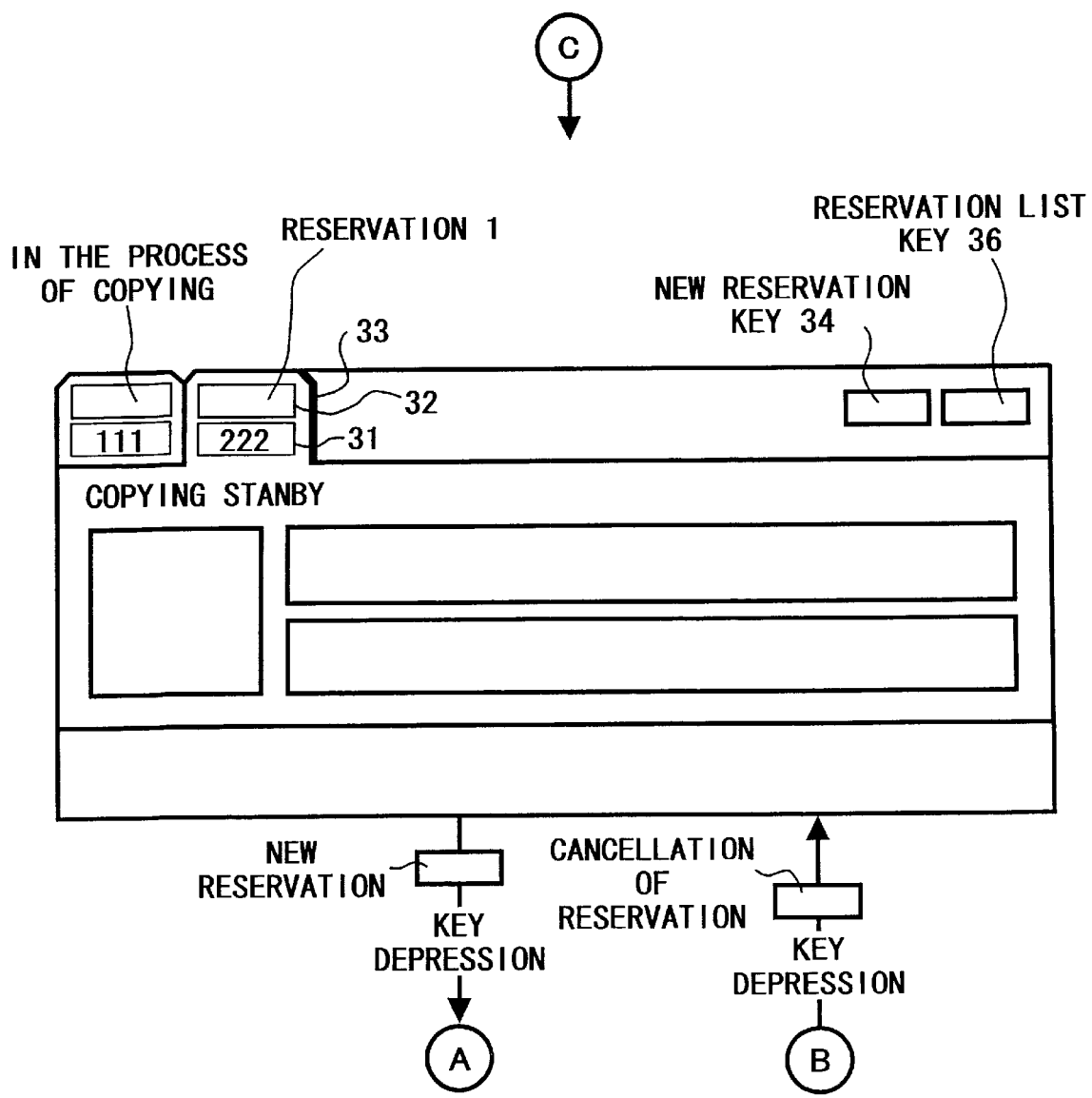
Figure 7D:
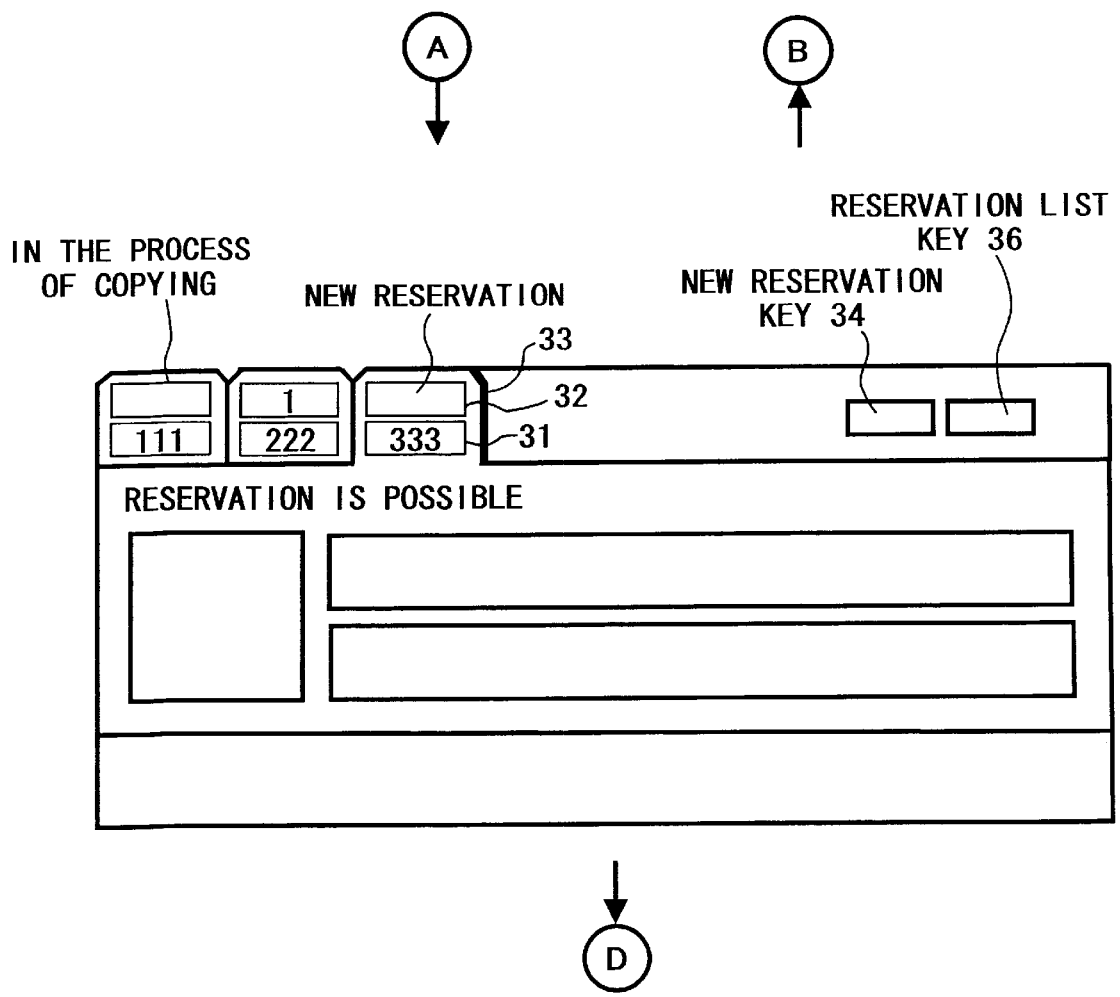

Then, the reservation screen may be replaced with the reservation screen illustrated in FIG. 7C, wherein the job status indicated in the applicable portion 32 of the tab 33 may be changed accordingly from the indication "NEW RESERVATION" to "RESERVATION 1". In the new reservation screen, information of the fixed job may be displayed on its principal portion together with messages, such as "COPYING IS ON STANDBY" as illustrated in FIG. 7C. In addition, a reserved job listing key 36 may be displayed in a blank area of the reservation screen. Thus, when a reserved job list is required to be displayed and contents of the reservation are to be changed or the reservation itself is to be canceled, the reservation job listing key may be depressed.

A new reservation key 34 may also be displayed on the reservation screen of FIG. 7C. When the new reservation key 34 is depressed, the job reservation screen of FIG. 7C may be replaced with that illustrated in FIG. 7D. As a result, the number of tabs 33 (i.e., cards) may be increased and a new reservation screen may simultaneously be open. In the new reservation screen of FIG. 7D, the job name "NEW RESERVATION" and a job number 333 may be indicated on a new tab 33. A job reservation through the job reservation screen of FIG. 7D may be executed in substantially the same manner as in the input operation of the job reservation executed through the job reservation screen of FIG. 7B.

Figure 7E:
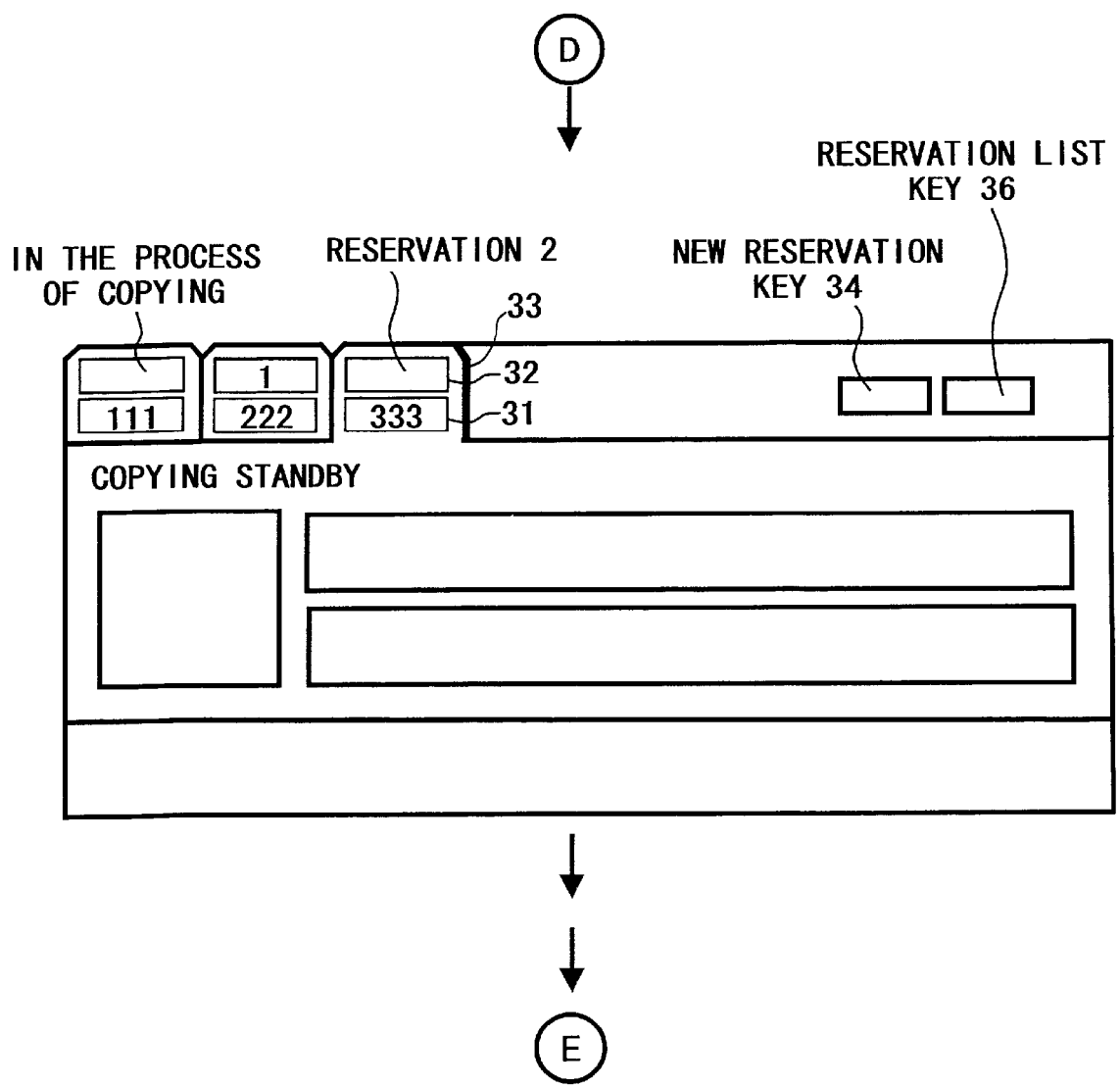

When a start key (not shown) is depressed, a start of a reading operation of an original document is commenced. When a job reservation is fixed, the indication of the job status display portion 32 accordingly may be changed from "NEW RESERVATION" to "RESERVATION 2" as illustrated in FIG. 7E. The rest of the reservation input operations executed through the job reservation screen of FIG. 7E may substantially be the same as executed through the job reservation screen of FIG. 7B. For example, substantially the same job reservation fixing operation as described with reference to FIG. 7C may be performed during a transition from the job reservation screen of FIG. 7D to that of FIG. 7E.

Figure 7F:
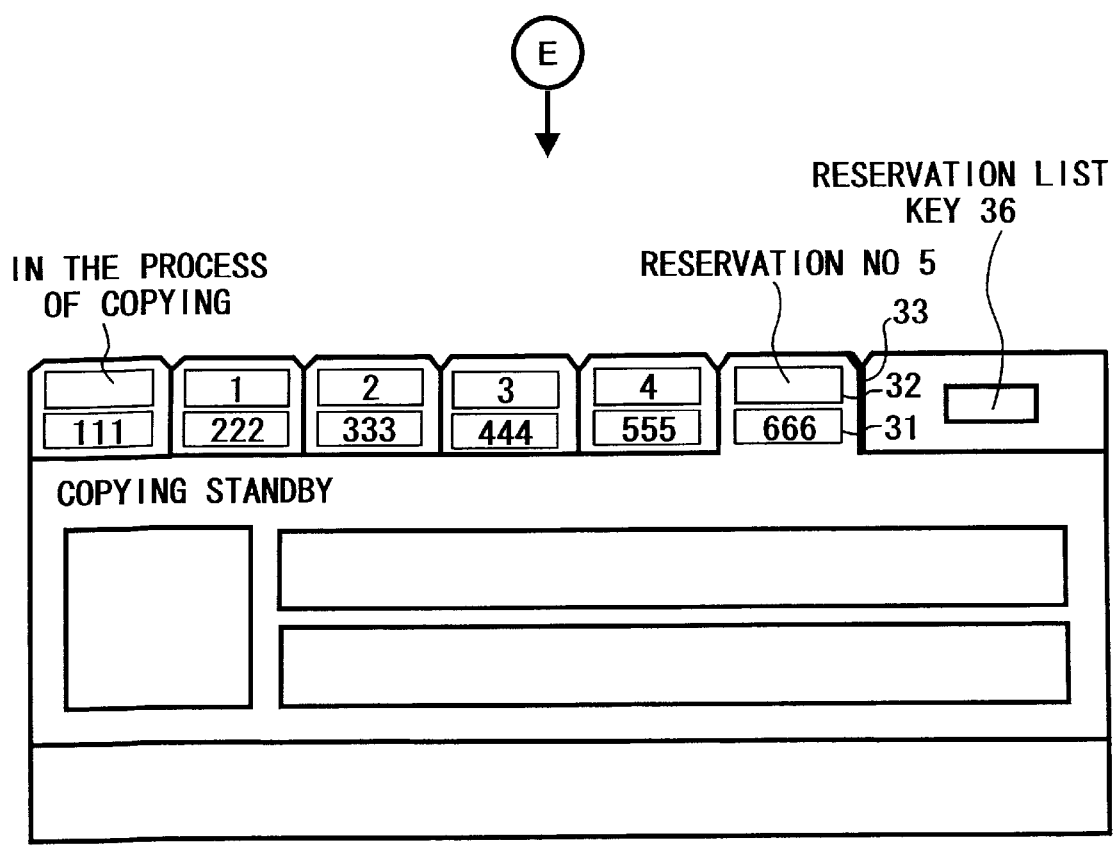

While a new job reservation and its fixing operation are repeated in the same manner, a number of the tabs may increase one by one each time when a new reservation is input. The number of reservation jobs may finally reach a prescribed maximum amount, i.e., more than the job reservation screen can physically indicate tabs in the blank areas. In this case, after the final job reservation is fixed, a key 34 having indication "NEW RESERVATION" illustrated in FIG. 7D may not be displayed in the blank as illustrated in FIG. 7F, wherein a reservation number indication portion 32 may indicate a reservation order for the fifth tab.

Figure 8A:
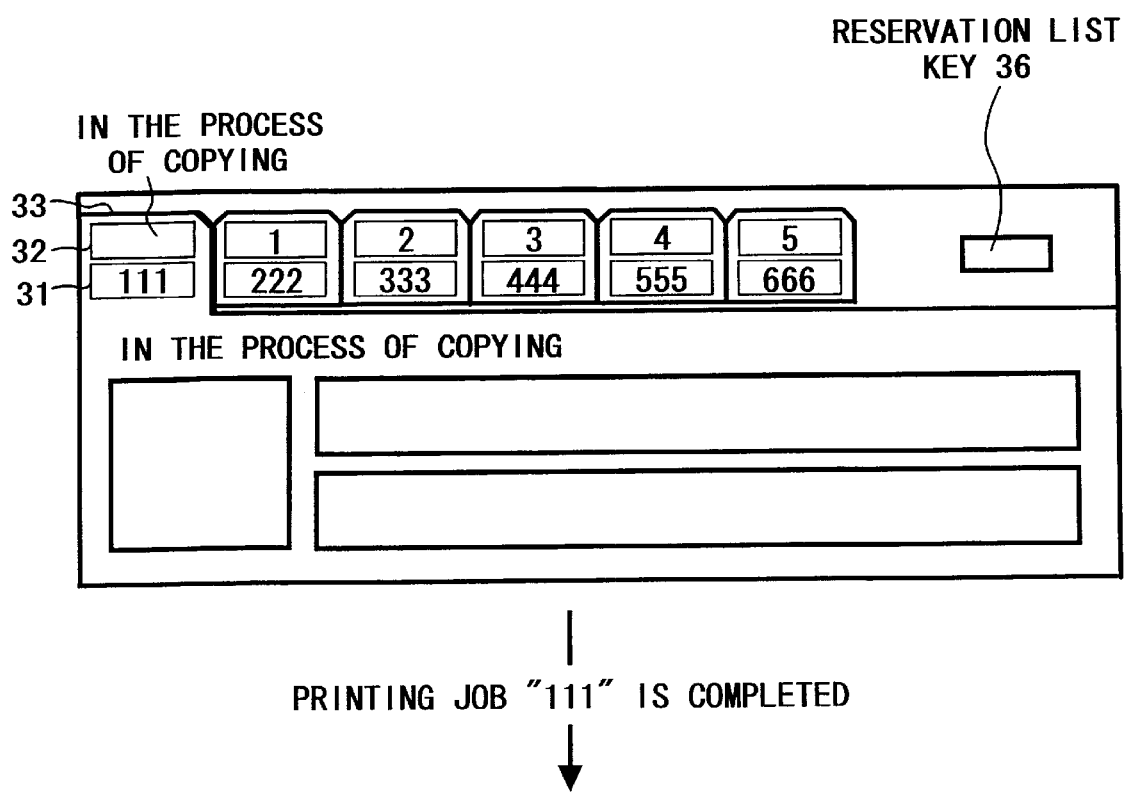
FIGS. 8A, 8B, 8C and 8D are diagrams for illustrating a transition of a reservation screen as a reserved job progresses, according to the second embodiment of the present invention.

A procedure for processing the reserved jobs will now be described, with reference to FIGS. 8A through 8D collectively illustrating a transition of a reservation screen when reserved jobs are processed. FIG. 8A illustrates a status where a maximum number of jobs are reserved. Since a top most tab 33 includes a job number 11 and an indication "IN THE PROCESS OF COPYING" in the job status indication portion 33, and information of a job corresponding to the job number is open on a principal display portion of an applicable reservation display, it may be understood therefrom that copying is in progress.

Figure 8B:
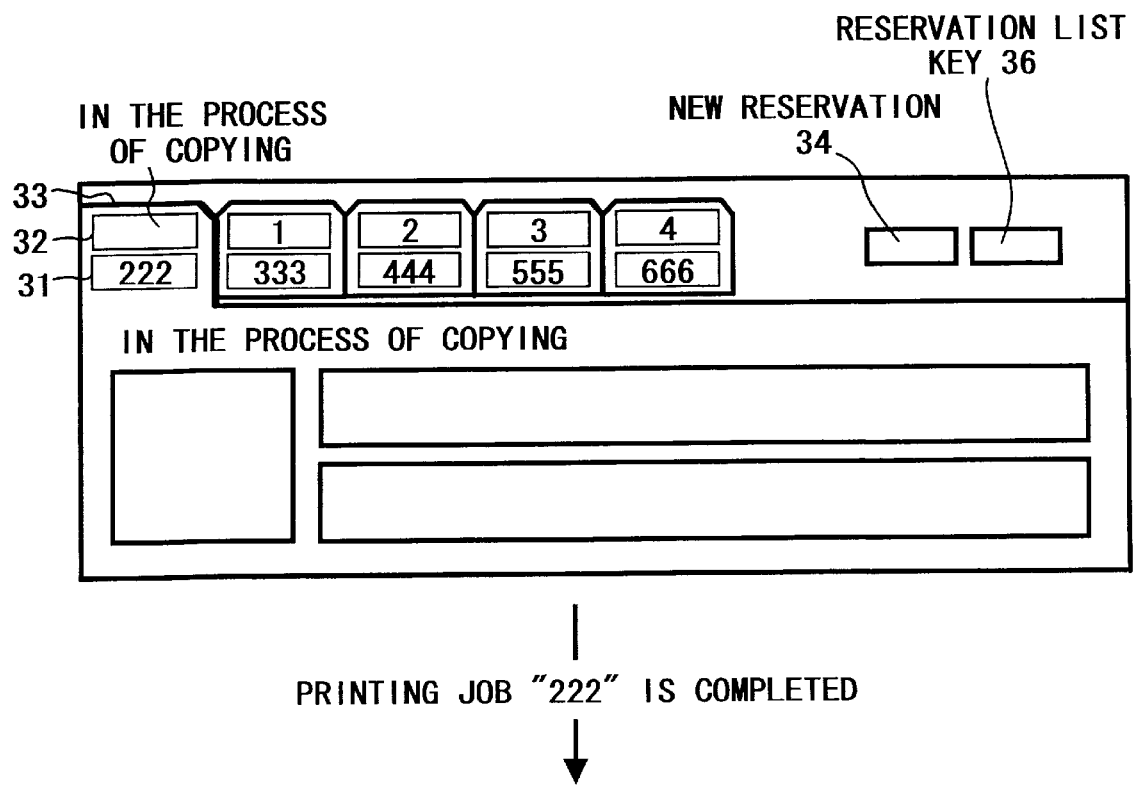
Figure 8C:
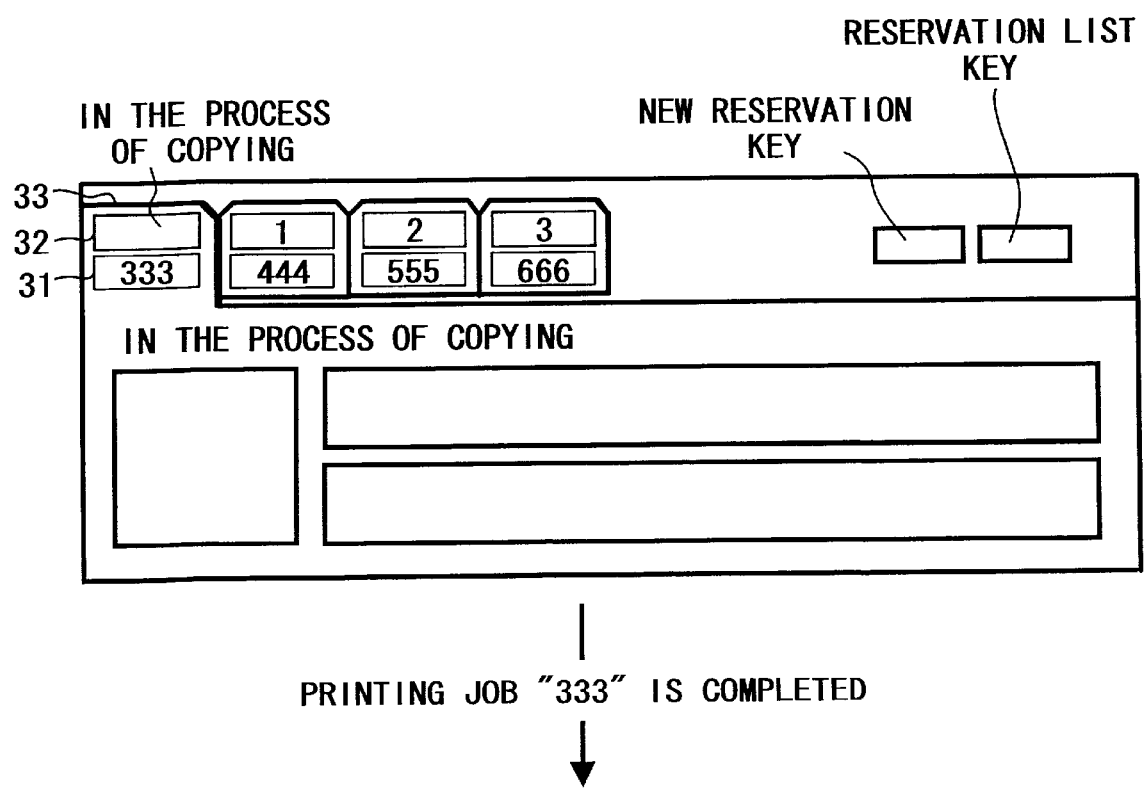

When the copying (i.e., the job 111) is completed, a processing operation for a next job number 222 may automatically be started and the job number 111 of the tab 33 is changed to the job number 222. Simultaneously, each of succeeding job reservation numbers may be numbered 1 through 4, respectively. In addition, each of job numbers 333 through 666 may be set to respective of tabs indicating reservation numbers 1 through 4, respectively. Further, since the number of reserved jobs decreases from the maximum amount, and accordingly, a new job reservation is possible to be input, the new job reservation key 34 may be displayed on the reservation screen as illustrated in FIG. 8B to accept a new job reservation input operation. When copying for the job number 222 is completed, since the next job having the job number 333 may automatically be started as illustrated in FIG. 8C, the job number indicated in the top most tab 33 may be changed to the job number 333. Simultaneously, each of the succeeding job reservation numbers may be numbered 1 through 3, respectively, and each of the job numbers 444 through 666 may be assigned to the respective of the tabs 33 having reservation numbers 1 through 3, respectively, as illustrated in FIG. 8C.

Figure 8D:
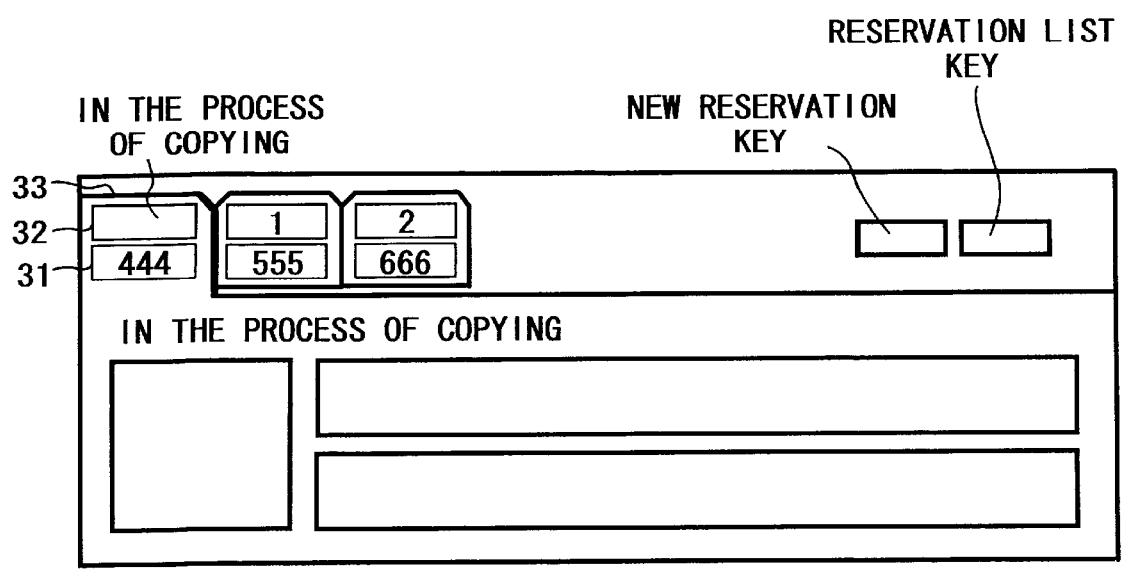

In this way, the plurality of reserved jobs are successively processed, and the reservation screen may be changed finally to that illustrated in FIG. 8D. Simultaneously, each of the succeeding job numbers assigned to respective of the tabs 33 is advanced by one, and the number of tabs 33 may decrease by one each time a reserved job is processed. The above-described operations may be successively executed until the final job reservation is processed.

Figure 9A:
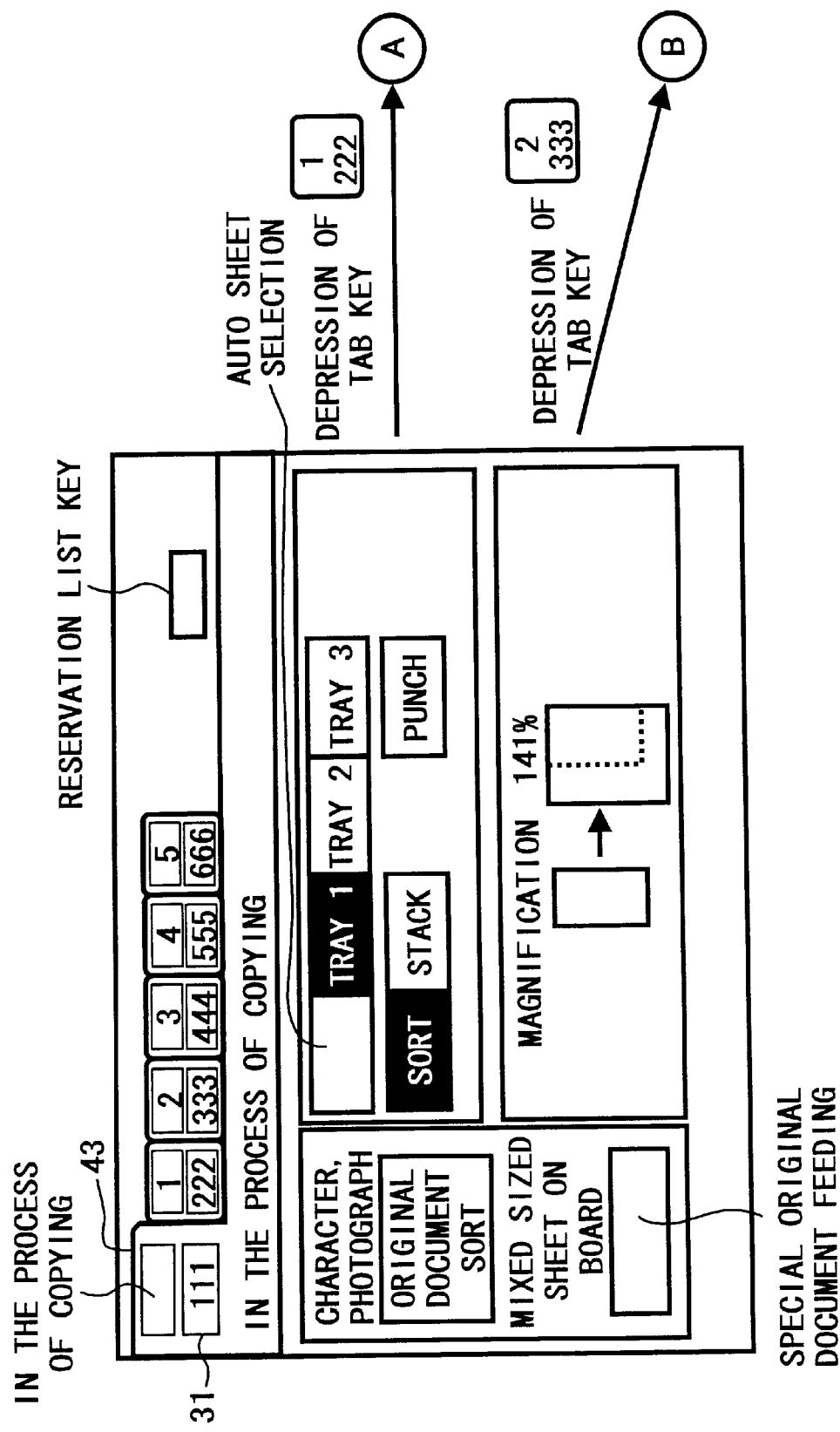
FIGS. 9A, 9B and 9C are diagrams for illustrating a transition of a reservation screen as contents of a reserved job confirmed, according to the second embodiment of the present invention.

A procedure of confirming contents of one or more reserved jobs will now be described, with reference to FIGS. 9A, 9B and 9C. FIG. 9A illustrates a status where the maximum number of jobs is reserved. As noted in the top most tab 43, a job having the job number 111 may be in progress of copying. Simultaneously, contents of the job 111 may be open on a principal display portion on a reservation screen of the tab 43. In addition, a touch panel, for example, may generate each of the tabs as an input device, so that a user can execute a key input operation by touching and depressing the tab. When a prescribed tab is depressed, contents of a job, whose number is indicated in the tab, may be displayed on the principal display portion so that the job can be confirmed. For example, when the tab 44 indicating both the reservation number 1 and the job number 222 illustrated in FIG. 9A is depressed, the job status indicated in the tab 43 may be changed to that of "RESERVATION 1" indicated in the tab 44' as illustrated of FIG. 9B. Simultaneously, its corresponding principal display portion may display contents of details of the job together with messages, such as "COPYING IS ON STANDBY".

Figure 9B:
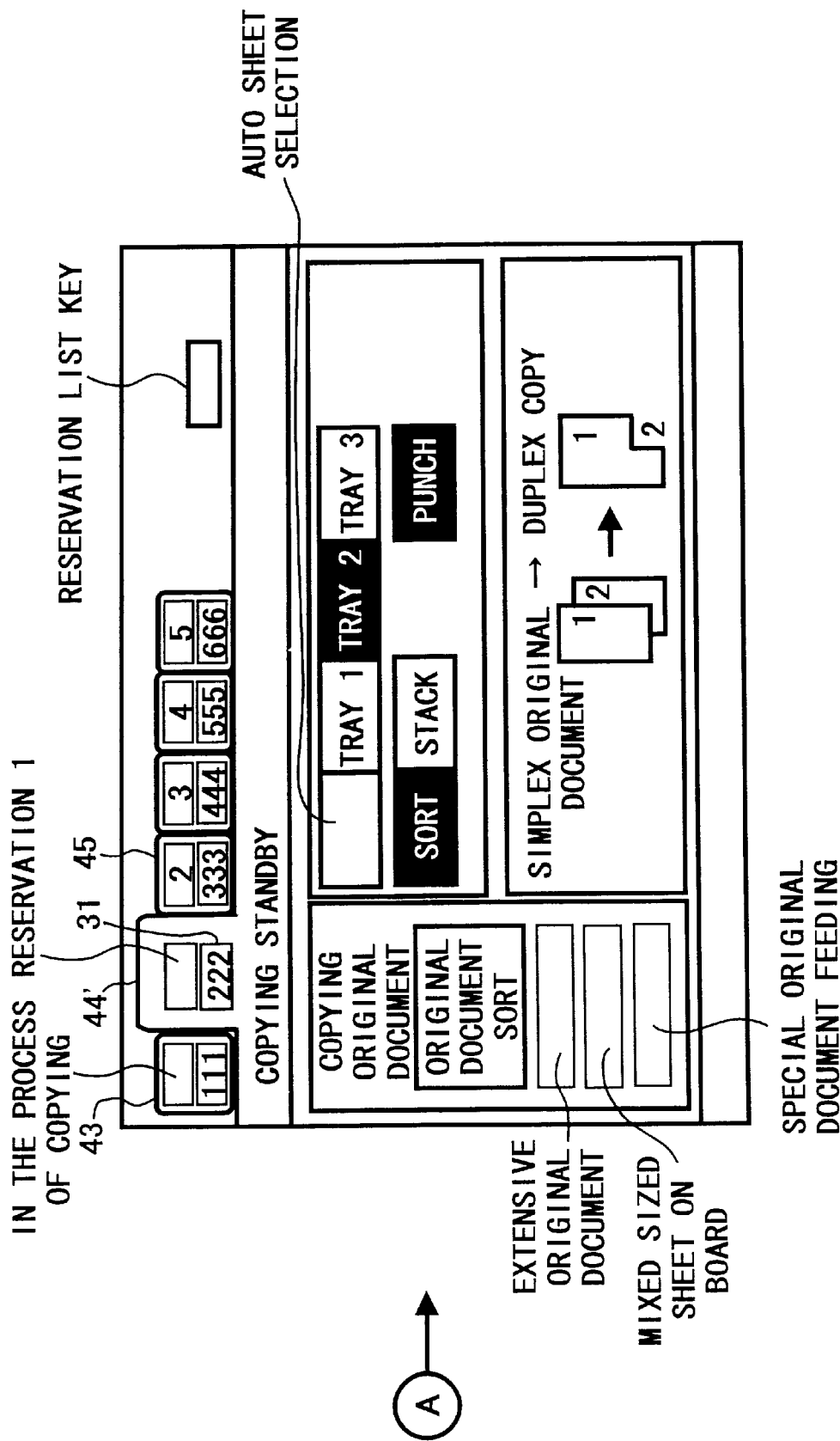
Figure 9C:
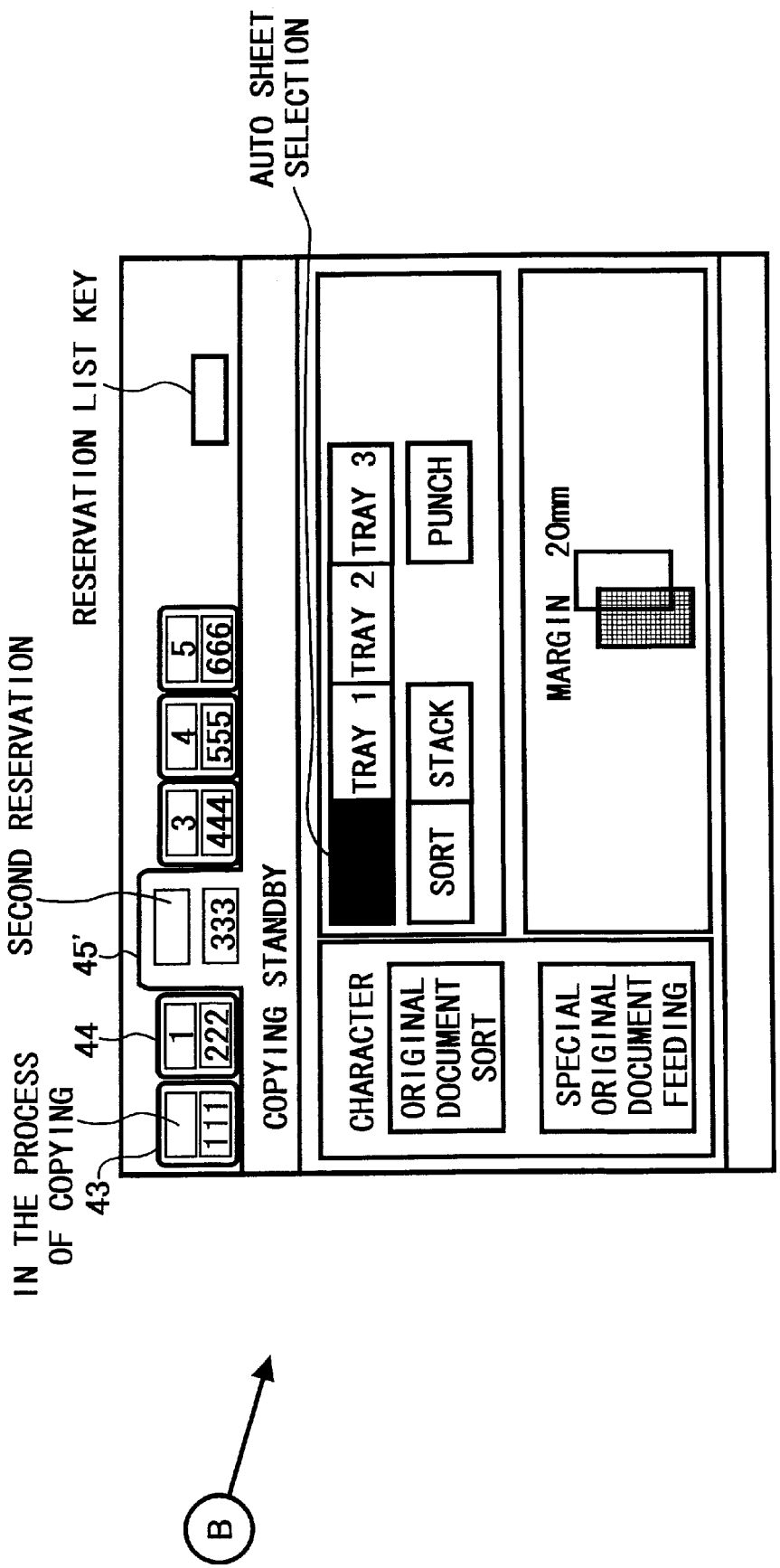

In addition, when the tab 45 indicating both the reservation number 2 and the job number 333 illustrated in FIG. 9B is depressed, a job status indicated in the tab 45 is changed to be "RESERVATION 2" as illustrated in FIG. 9C. Simultaneously, the corresponding principal display portion may display details of contents of the corresponding job together with messages, such as "COPYING IS ON STANDBY". Thus, contents of any one of reserved jobs can optionally be confirmed through a principal display portion when a prescribed tab is depressed and contents of a corresponding job are displayed.

Figure 10C:
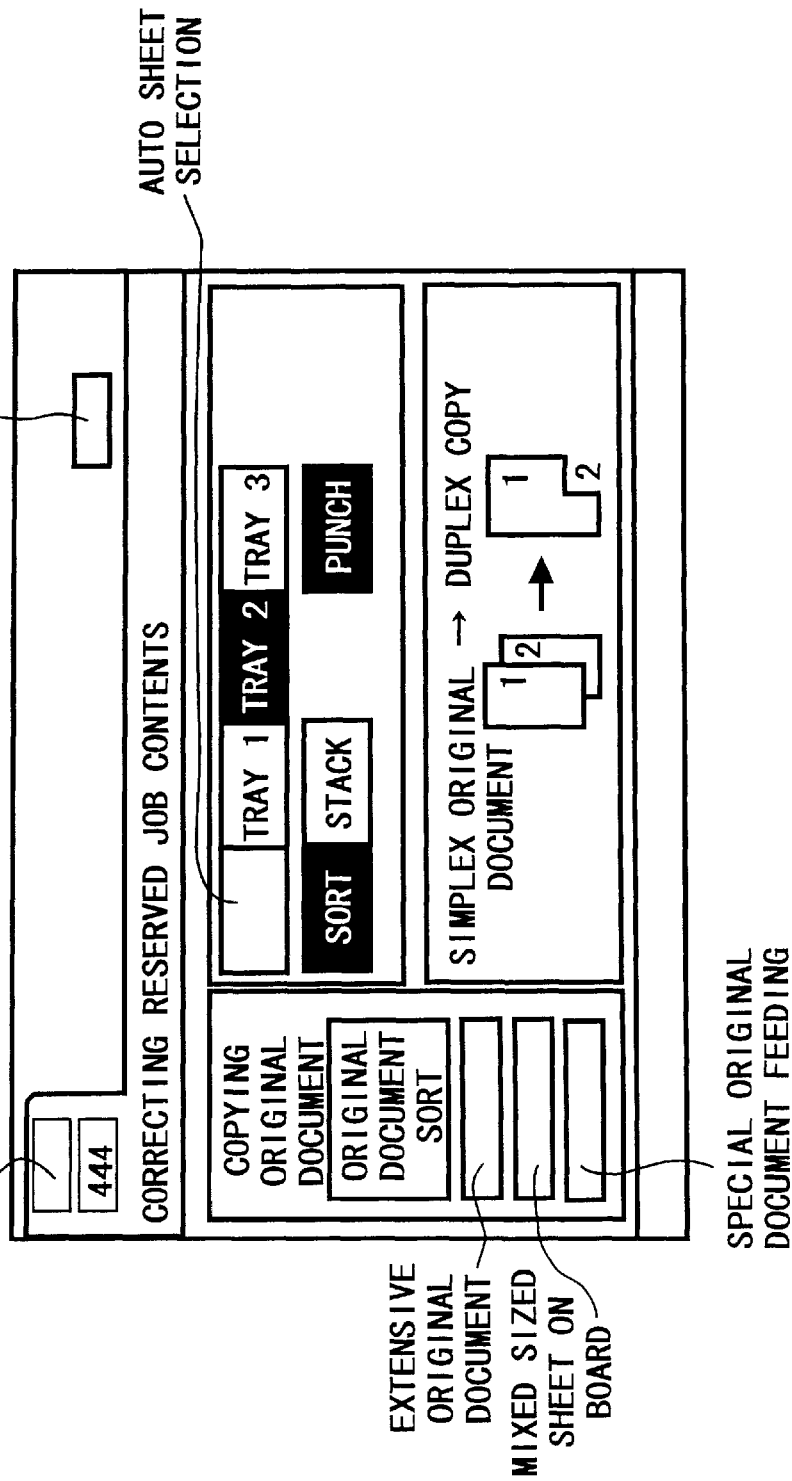

A procedure of changing a reservation order (i.e., a job processing order) and/or contents of a job reserved will now be described with reference to FIGS. 10A through 10D. FIG. 10A illustrates a status where the maximum number of jobs, for example five jobs, are reserved. As noted from FIG. 10A, a job having the job number 111 is in progress of copying as indicated in the tab 43, and simultaneously, contents of the job of the job number 111 may be open on a principal display portion of a reservation screen. A reserved job listing key 36 may be displayed in a blank of a reservation screen to be depressed as illustrated in FIG. 10A.

When the reserved job-listing key is depressed, the reservation screen of FIG. 10A may be replaced with a new reservation screen, wherein entire existing reserved jobs are listed in a prescribed manner as illustrated in FIG. 10B. An order of reserved jobs or contents of any one of jobs may be changed, and a reservation itself may be deleted through the reservation screen listing the entire existing jobs. Information for each of the jobs 111 through 666 may be indicated in a list together with respective of the job numbers 60 through 65 on the reservation screen. In addition, a plurality of input keys, such as a return key 51, a contents changing key 52, an order changing key 53, and a document deleting key 54 may be displayed on the reservation screen, as illustrated in FIG. 10B.

When changing contents of a prescribed job reserved, a user may call the reservation screen listing the entire existing jobs by depressing the reserved job listing key 36 and confirm a prescribed job, whose contents are to be changed, on the reservation screen. The user may then depress the contents changing key 52 to change contents of a prescribed reservation job. After that, when contents of a reservation job, for example, a reservation number 3 (i.e., the job number 444) is designated and the tab 46 is depressed, the reservation screen of FIG. 10B may be replaced with a reservation screen as illustrated in FIG. 10C. A construction of the reservation screen of FIG. 10C may be substantially the same as the reservation screen illustrated in FIG. 7B, which is utilized when a new job reservation is input as described earlier. Only information of the designated reservation job, for example, the reservation No. 3 having the job number 444, may be indicated to be changed on the principal display portion of the reservation screen as illustrated in FIG. 10C. Through the reservation screen of FIG. 10C, a designating operation for changing contents of the designated reservation job may be executed, and contents of the job changed may be confirmed thereon. The reservation job corrected may be fixed when the correction completing key 55 provided on the reservation screen in a blank area thereof is depressed.

In addition, when changing an order of processing a plurality of reserved jobs, a user may call the reservation screen of FIG. 10B, and confirm an applicable job, whose processing order is to be changed, on the reservation screen. After that, if a reserved job, for example, the reservation No. 1 having the job number 222, is to be replaced with the reservation No. 5 having the job number 666, the user may designate the reservation Nos. 1 and 5, and depress the order changing key 53. As a result, the processing order of the reservation Nos. 1 and 5 may be exchanged with each other. At this time, the reservation screen of FIG. 10B may be replaced with the reservation screen illustrated FIG. 10D, which is similar to the reservation screen on FIG. 10A, wherein a job having the job number 111 is in progress of copying, and its job contents are open on the principal displaying portion of the reservation screen. Completion of the job processing order-changing operations may be confirmed by checking indications of reservation job numbers on applicable tabs. For example, this can be confirmed by recognizing that the job number 666 is indicated on the tab 44 having the reservation No. 1, and the job number 222 is indicated on the tab 48 having the reservation No. 5, as illustrated in FIG. 10D.

When deleting one or more reserved jobs, a user may call the reservation screen of FIG. 10B, and confirm a job to be deleted on the reservation screen. Then, the user may designate a reservation number to be deleted, for example, the reservation No. 2 having the job number 333, and depress the document deleting key 54. As a result, the reservation No. 2 may be deleted (i.e., canceled). A reservation screen appearing after the above-described operation is illustrated in FIG. 10E. Thus, the reservation screen may return to the reservation screen of FIG. 10A, wherein the job of the job number 111 is in progress of copying and its job contents are open on the principal display portion of the reservation screen. The user can thereby confirm the completion of the job deletion when recognizing a change in the indication of the tab having the job number. Namely, the job number 333 existing in the tab 45 of the reservation number 2 may be deleted in this example, and each succeeding reservation number may be advanced by one. As a result, the job number 444 of the next order may be indicated on the tab 45 having the reservation No. 2 as illustrated in FIG. 10E.

According to the second embodiment, advantageously, a plurality of existing reserved jobs can be listed for a plurality of purposes, such as changing contents, canceling a reservation, etc.

The mechanisms and processes set forth in the present invention may be implemented using one or more conventional general purpose microprocessors and/or signal processors programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits, by interconnecting an appropriate network of conventional component circuits or by a combination thereof with one or more conventional general purpose microprocessors and/or signal processors programmed accordingly.

The present invention thus also includes a computer-based product which may be hosted on a storage medium and include instructions which can be used to program a microprocessor to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. A user interface configured to accept and reserve a job request from a user, comprising:

an input operation screen configured to allow a new job setting operation while indicating at least a status of a precedent job in progress, wherein said input operation screen is configured to accept and store a new job reservation before a reserved precedent job is processed, said input operation screen displays at least one reserved job not yet processed in a list when a prescribed key is depressed, said at least one reserved job not yet processed is indicated in at least one tab of at least one card formed on the input operation screen, one-by-one, in response to a reservation of a new job, and tabs of the at least one tab are aligned in a job processing order.

2. The user interface according to claim 1, wherein each tab of said at least one tab indicates at least one of a job reservation number, job identification information, and a job processing order.

3. The user interface according to claim 2, wherein each tab of said at least one tab includes a function key, and when a corresponding function key is depressed, contents of a corresponding job are indicated on the input operation screen when a prescribed tab is displayed.

4. The user interface according to claim 2, wherein at least one of a deletion of a prescribed reservation and a change in a job processing order is reflected as a job reservation condition displayed on the input operation screen.

5. The user interface according to claim 1, wherein at least one of a deletion of a prescribed reservation and a change in a job processing order is reflected as a job reservation condition displayed on the input operation screen.

6. An image processing apparatus including a user interface, comprising:

an input operation screen configured to accept a new job setting operation while indicating at least a status of a prescribed job in progress, wherein said input operation screen is configured to accept and store a new job reservation before a reserved precedent job is processed, and to display information regarding reserved jobs in progress in a list, said information is displayed on a private use area provided on the input operation screen, said information is indicated on one or more tabs of cards formed on the input operation screen in response to a reservation of a job, and said tabs are aligned in a job processing order.

7. The image processing apparatus according to claim 6, wherein each of said tabs indicate at least one of a job reservation number, job identification information, and a job processing order.

8. The image processing apparatus according to claim 7, wherein at least one of deletion of a reservation and a change in a job processing order is reflected in a job reservation condition displayed on the input operation screen.

9. The image processing apparatus according to claim 7, wherein each of said tabs functions as a key for inputting contents of an applicable job corresponding to a tab displayed and depressed on the input operation screen.

10. The image processing apparatus according to claim 6, wherein at least one of deletion of a reservation and a change in a job processing order is reflected in a job reservation condition displayed on the input operation screen.

11. The image processing apparatus according to claim 6, wherein each of said tabs functions as a key for inputting contents of an applicable job corresponding to a tab displayed and depressed on the input operation screen.

12. The image processing apparatus according to claim 6, wherein at least one of deletion of a reservation and a change in a job processing order is reflected in a job reservation condition displayed on the input operation screen.

\* \* \* \* \*